United States Patent
Yamashita et al.

(10) Patent No.: US 8,441,706 B2
(45) Date of Patent: May 14, 2013

(54) OPTICAL MODULE, OPTICAL CONTROL METHOD BY OPTICAL MODULE, OPTICAL SWITCH, AND OPTICAL SWITCHING METHOD

(75) Inventors: Shinji Yamashita, Kawasaki (JP); Tsuyoshi Yamamoto, Kawasaki (JP); Masaaki Kawai, Kawasaki (JP); Hiroyuki Fujita, Tokyo (JP)

(73) Assignees: Fujitsu Limited, Kawasaki (JP); The University of Tokyo, Tokyo (JP)

( * ) Notice: Subject to any disclaimer, the term of this patent is extended or adjusted under 35 U.S.C. 154(b) by 624 days.

(21) Appl. No.: 12/461,020

(22) Filed: Jul. 29, 2009

(65) Prior Publication Data

US 2010/0033796 A1   Feb. 11, 2010

(30) Foreign Application Priority Data

Aug. 8, 2008  (JP) ................. 2008-205070

(51) Int. Cl.
    *G02B 26/08*  (2006.01)
(52) U.S. Cl.
    USPC ..................... 359/224.1; 359/847
(58) Field of Classification Search ........... 359/224.1, 359/224.2, 225.1, 226.1, 226.2, 847, 849; 385/17, 385/18, 24, 37
    See application file for complete search history.

(56) References Cited

U.S. PATENT DOCUMENTS

| | | | |
|---|---|---|---|
| 6,445,433 B1 | 9/2002 | Levola | |
| 7,016,100 B2* | 3/2006 | Kurosawa | 359/295 |
| 7,079,770 B2* | 7/2006 | Schofield | 398/83 |
| 7,116,465 B2* | 10/2006 | Maeda et al. | 359/291 |
| 7,199,772 B2* | 4/2007 | Makino | 345/84 |
| 7,212,739 B2* | 5/2007 | Graves et | 398/5 |
| 2002/0149864 A1* | 10/2002 | Kaneko | 359/846 |
| 2003/0063401 A1 | 4/2003 | Kurczynski et al. | |
| 2005/0030438 A1 | 2/2005 | Nishioka | |
| 2006/0012844 A1* | 1/2006 | Fujii et al. | 359/224 |
| 2006/0228070 A1 | 10/2006 | Davis et al. | |
| 2006/0245023 A1* | 11/2006 | Akedo et al. | 359/223 |
| 2007/0003187 A1 | 1/2007 | Nakano et al. | |
| 2007/0081761 A1* | 4/2007 | Doerr et al. | 385/16 |
| 2008/0316566 A1* | 12/2008 | Lan | 359/237 |

FOREIGN PATENT DOCUMENTS

| | | |
|---|---|---|
| EP | 1 662 290 | 5/2006 |
| EP | 1662290 | 5/2006 |
| EP | 1674906 | 6/2006 |
| EP | 1701580 | 9/2006 |
| EP | 1887392 | 2/2008 |

(Continued)

OTHER PUBLICATIONS

Patent Abstracts of Japan Publication No. 2008-040435 Date of Publication: Feb. 21, 2008.

(Continued)

*Primary Examiner* — Frank Font
(74) *Attorney, Agent, or Firm* — Staas & Halsey LLP

(57) ABSTRACT

An optical module includes a mirror which reflects input light and which outputs output light; and a mirror control section which is opposite to the mirror and which controls, at the time of the input light being reflected from a reflecting surface of the mirror, the reflecting surface by distorting the reflecting surface according to voltage applied to the mirror so as to output the output light an optical coupling characteristic of which changes. By using this optical module, the optical coupling characteristic of the output light changes.

16 Claims, 21 Drawing Sheets

FOREIGN PATENT DOCUMENTS

| | | |
|---|---|---|
| JP | 2005-092175 | 4/2005 |
| JP | 2005-249914 | 9/2005 |
| JP | 2008-040435 | 2/2008 |

OTHER PUBLICATIONS

Patent Abstracts of Japan, Publication No. 2005-092175, published Jul. 4, 2005.
Patent Abstracts of Japan, Publication No. 2005-249914, published Sep. 15, 2005.
Japanese Office Action dated Jul. 17, 2012 issued in corresponding Japanese Patent Application No. 2008-205070.
European Search Report dated Dec. 8, 2009 corresponding to Application No. 091662064.4.
Extended European Search Report dated Feb. 24, 2010 in Application No. 09166206.4.

* cited by examiner

OPTICAL MODULE, OPTICAL CONTROL METHOD BY OPTICAL MODULE, OPTICAL SWITCH, AND OPTICAL SWITCHING METHOD

CROSS-REFERENCE TO RELATED APPLICATIONS

This application is based upon and claims the benefits of priority of the prior Japanese Patent Application No. 2008-205070, filed on Aug. 8, 2008, the entire contents of which are incorporated herein by reference.

FIELD

The embodiments discussed herein are related to an optical module, an optical control method by such an optical module, an optical switch, and an optical switching method.

BACKGROUND

A micro-electro-mechanical system (MEMS) technique is advanced and is applied to various fields. In the field of optical communication, a micromirror, for example, to which the MEMS technique is applied is developed and is used in a variable optical attenuator, an optical switch, or the like.

An optical switch includes a micromirror to which the MEMS technique is applied and the angle of a reflecting surface of which can be controlled. Input light inputted from a plurality of input ports is reflected from the micromirror and is inputted to each of output ports selected from among a plurality of output ports. By doing so, optical communication can be performed. Such an optical switch will now be described.

FIG. 20A is a view for describing a light reflection mechanism of an optical switch. FIG. 20B is a view for describing a surface of a collimating lens of the optical switch to which output light is inputted. An optical switch 500 depicted in FIGS. 20A and 20B includes only components that are necessary for describing the light reflection mechanism.

As depicted in FIG. 20A, input light P1 inputted to the optical switch 500 is reflected from a micromirror 510a. Output light Q1 reflected from the micromirror 510a passes through a lens 540 and is inputted to a cylindrical collimating lens 520.

The micromirror 510a of the optical switch 500 is then rotated to the position of a micromirror 510b in order to perform switching of input light. In this case, input light P2 inputted from the same direction where the input light P1 is inputted is reflected from the micromirror 510b. As depicted in FIG. 20A, output light Q2 reflected from the micromirror 510b is outputted at an angle to the output light Q1. The output light Q2 is then condensed by the lens 540 and is inputted to the collimating lens 520.

As depicted in FIG. 20B, compared with the output light Q2 inputted to a portion X2 near an edge of a surface of the collimating lens 520, the output light Q1 inputted to a portion X1 near the center of the surface of the collimating lens 520 is small in attenuation amount. An attenuation amount corresponding to a position on the surface of the collimating lens 520 to which output light is inputted will be described later. The output light Q1 and the output light Q2 pass through the collimating lens 520 and an optical fiber 530 and are outputted to the outside.

FIG. 21 is a graph showing an attenuation amount corresponding to a positional deviation between a position on a surface to which light is inputted and the center of the surface.

As has been described in FIG. 20B, the output light Q1 and the output light Q2 reflected from the micromirrors 510a and 510b, respectively, differ in attenuation amount. This depends on positions on the surface of the collimating lens 520 to which the output light Q1 and the output light Q2 are inputted. FIG. 21 illustrates an attenuation amount of light corresponding to a position to which the light is inputted. In FIG. 21, an x-axis indicates the amount ([mm]) of a positional deviation between a position on the surface of the collimating lens 520 to which light is inputted and the center (point O on the graph) of the surface of the collimating lens 520 and a y-axis indicates an attenuation amount ([dB]) of light corresponding to a position to which the light is inputted with the intensity of the light at the center of the surface of the collimating lens 520 as reference.

According to the graph plotted in FIG. 21, an attenuation amount increases like a quadratic function (square law characteristic) with an increase in the distance between a position on the surface of the collimating lens 520 to which light is inputted and the center of the surface of the collimating lens 520. That is to say, the intensity of light decreases with an increase in the distance between a position on the surface of the collimating lens 520 to which light is inputted and the center of the surface of the collimating lens 520. In addition, an attenuation amount increases like a quadratic function, so the rate of an increase in attenuation amount becomes higher with an increase in the distance between a position on the surface of the collimating lens 520 to which light is inputted and the center of the surface of the collimating lens 520. For example, an increase in attenuation amount caused by the positional deviation from the point O to point a1 is compared with an increase in attenuation amount caused by the positional deviation from point a2 to point a3. In both cases, the amount of the positional deviation is dx [mm]. In the former case, the difference in attenuation amount is dy1 [dB]. In the latter case, however, the difference in attenuation amount is dy2 (>dy1) [dB].

If the optical coupling characteristic of output light is a square law characteristic, then an optical module such an optical switch is apt to be influenced by fluctuations in driving voltage, power supply noise, or external noise. As a result, the intensity of output light is apt to fluctuate.

Accordingly, a method for controlling fluctuations in the intensity of light even under an external influence by changing the optical coupling characteristic of output light from a square law characteristic to a linear characteristic is proposed. For example, output light reflected from a micromirror is made to pass through a transmission filter on which transmittance differs among different positions, and is inputted to a collimating lens. By doing so, the optical coupling characteristic can be changed from a square law characteristic to a linear characteristic and fluctuations in the intensity of light caused by an external influence can be controlled (see, for example, Japanese Laid-open Patent Publication No. 2008-40435).

SUMMARY

According to one aspect of the present invention, an optical module for reflecting input light includes a mirror which reflects the input light and which outputs output light and a mirror control section which is opposite to the mirror and which controls, at the time of the input light being reflected from a reflecting surface of the mirror, the reflecting surface by distorting the reflecting surface according to voltage applied to the mirror so as to output the output light an optical coupling characteristic of which changes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

Figure 8A:
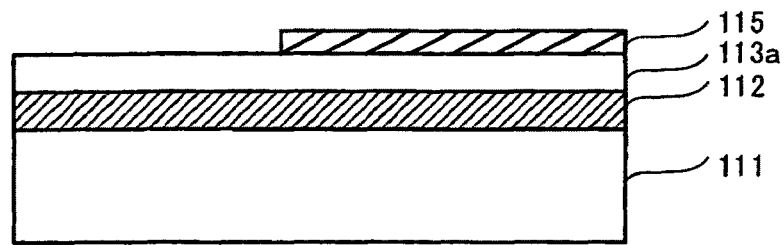
Figure 8B:
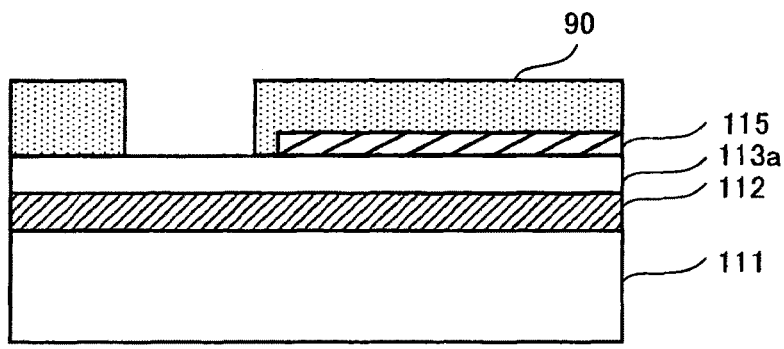
Figure 8C:
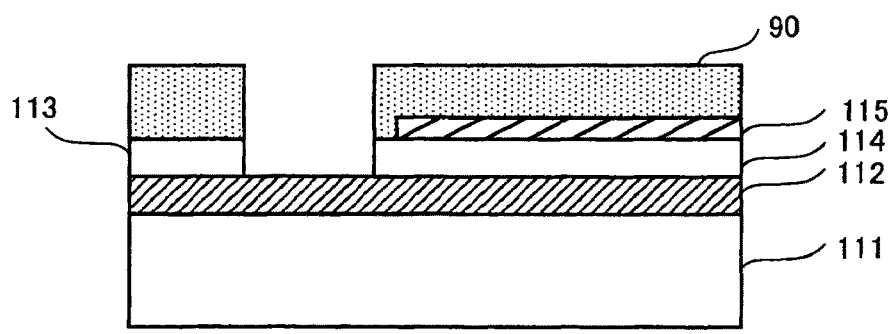
Figure 10:
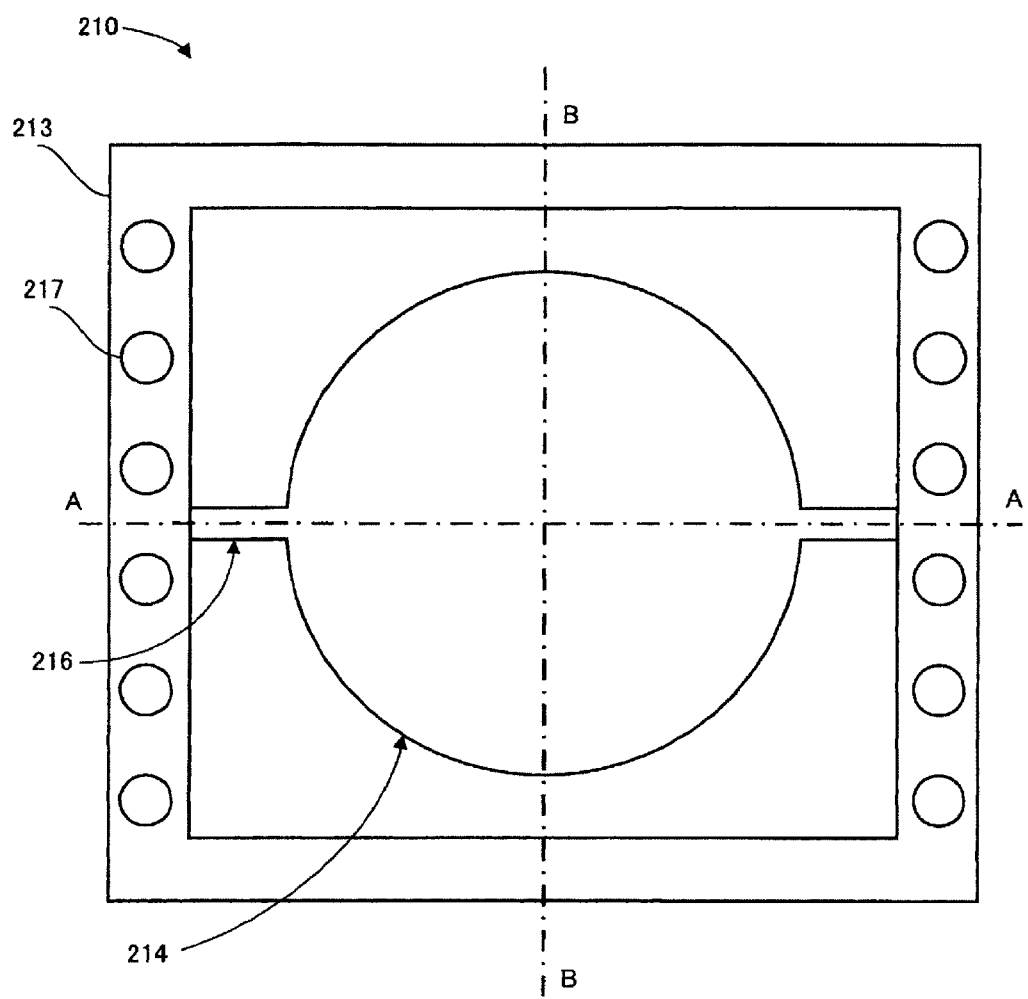
Figure 11:
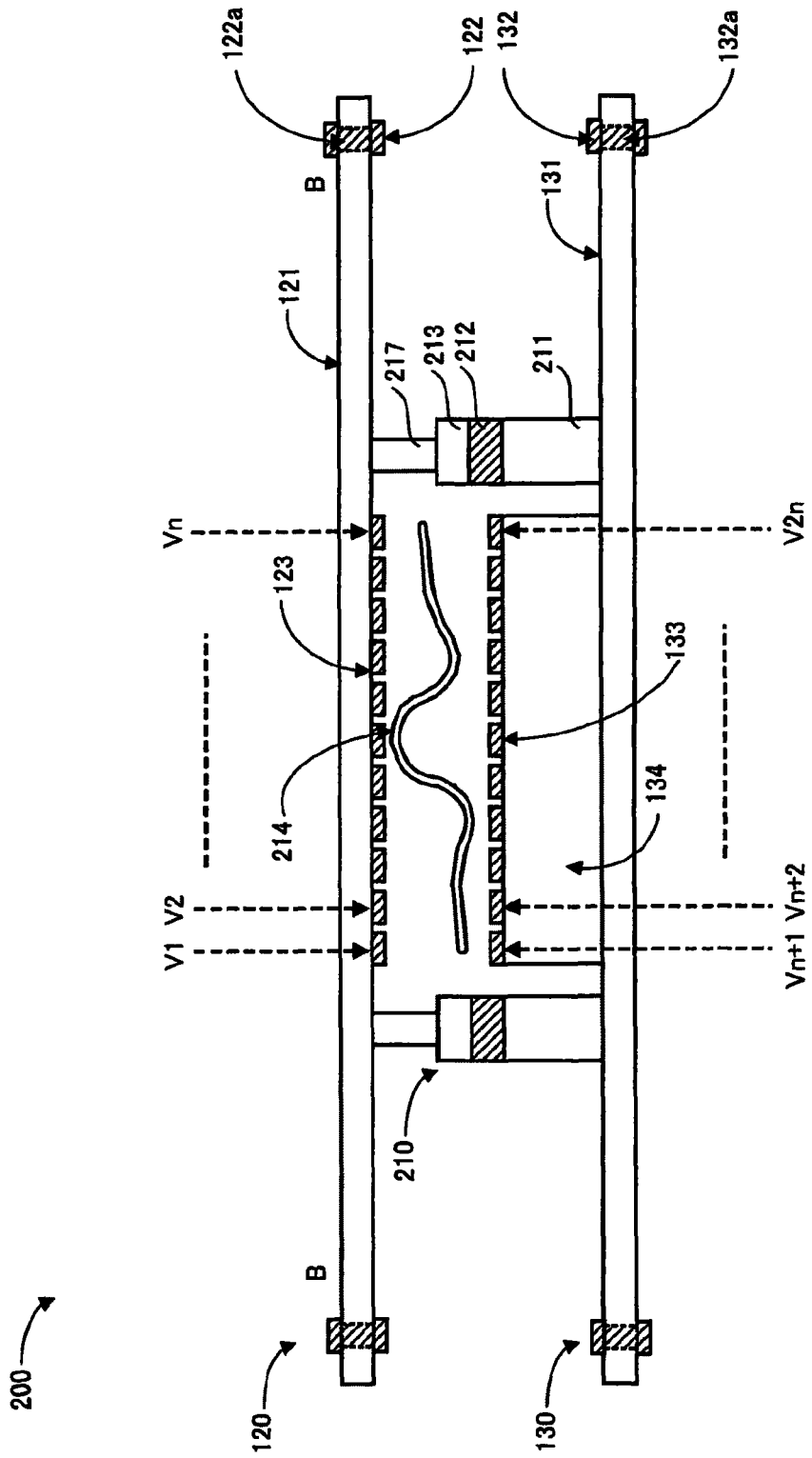
Figure 12A:
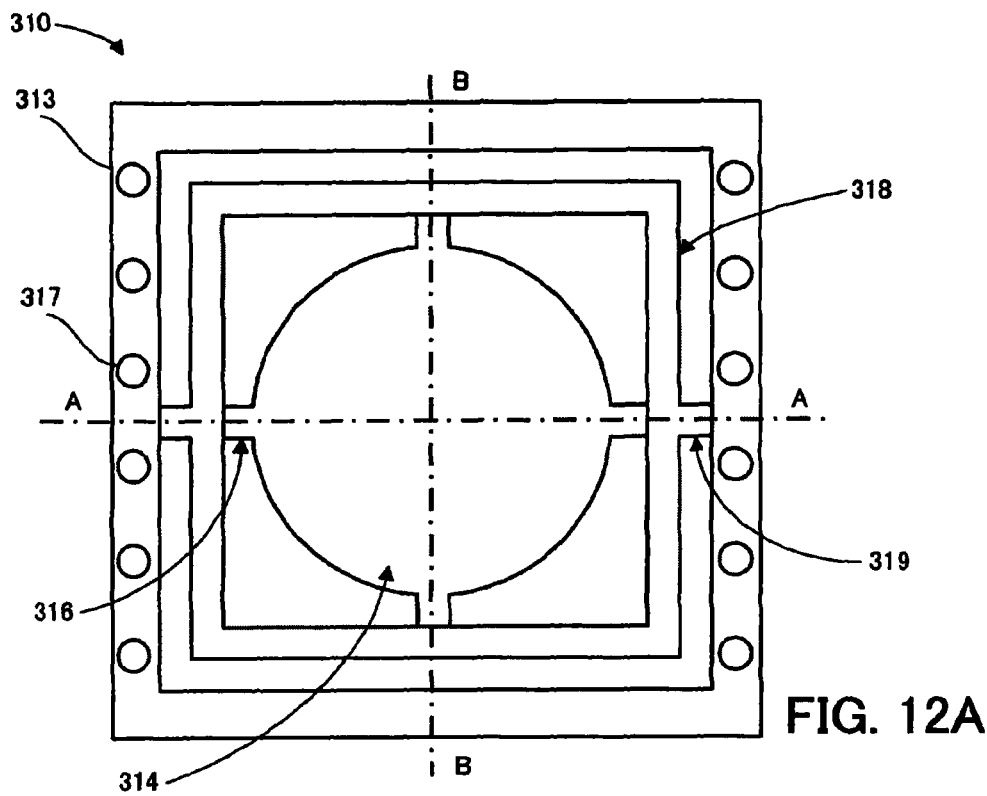
Figure 12B:
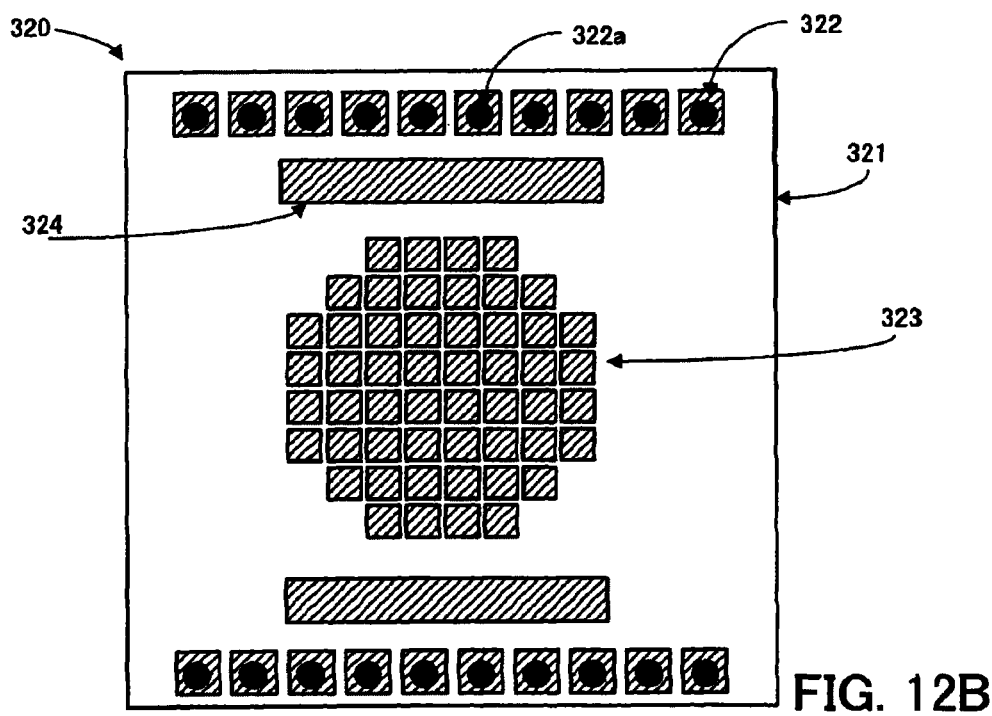
Figure 13:
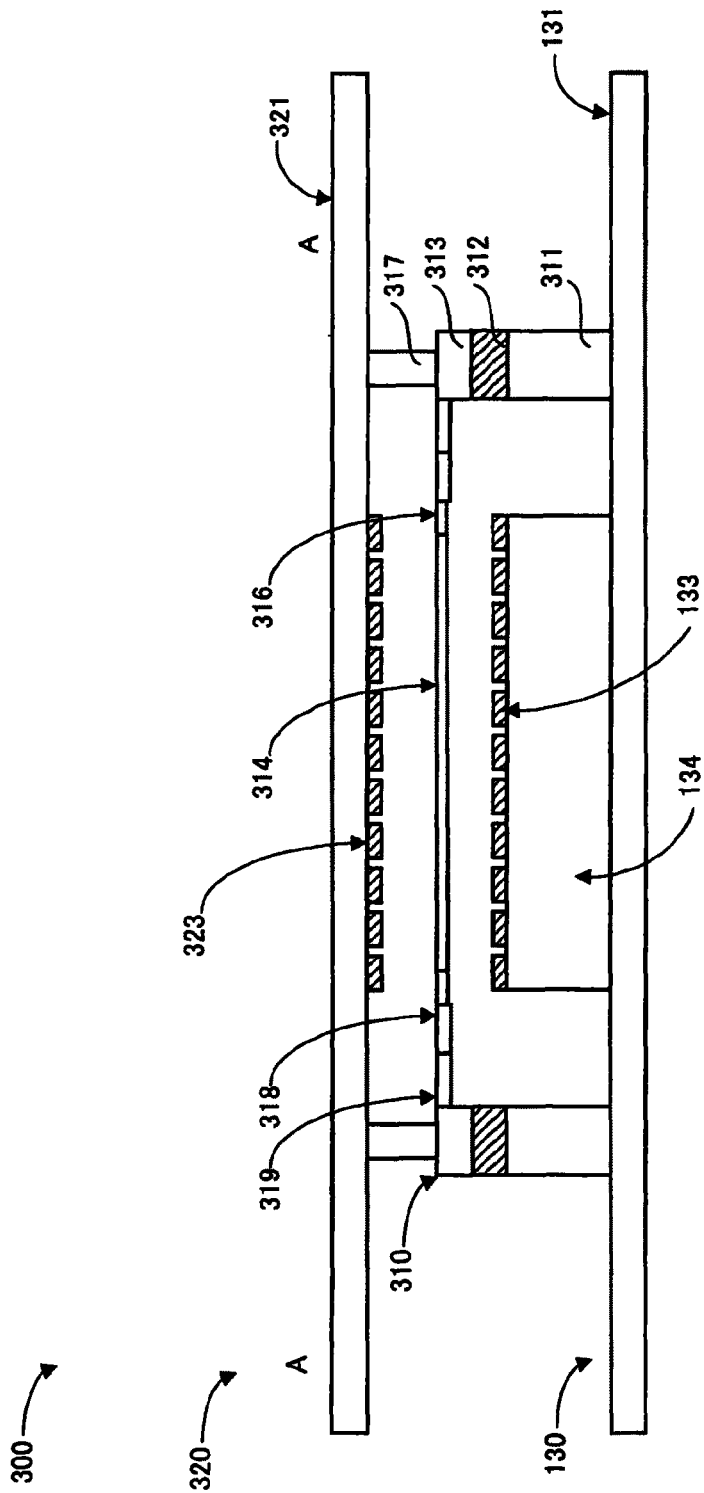
Figure 14:
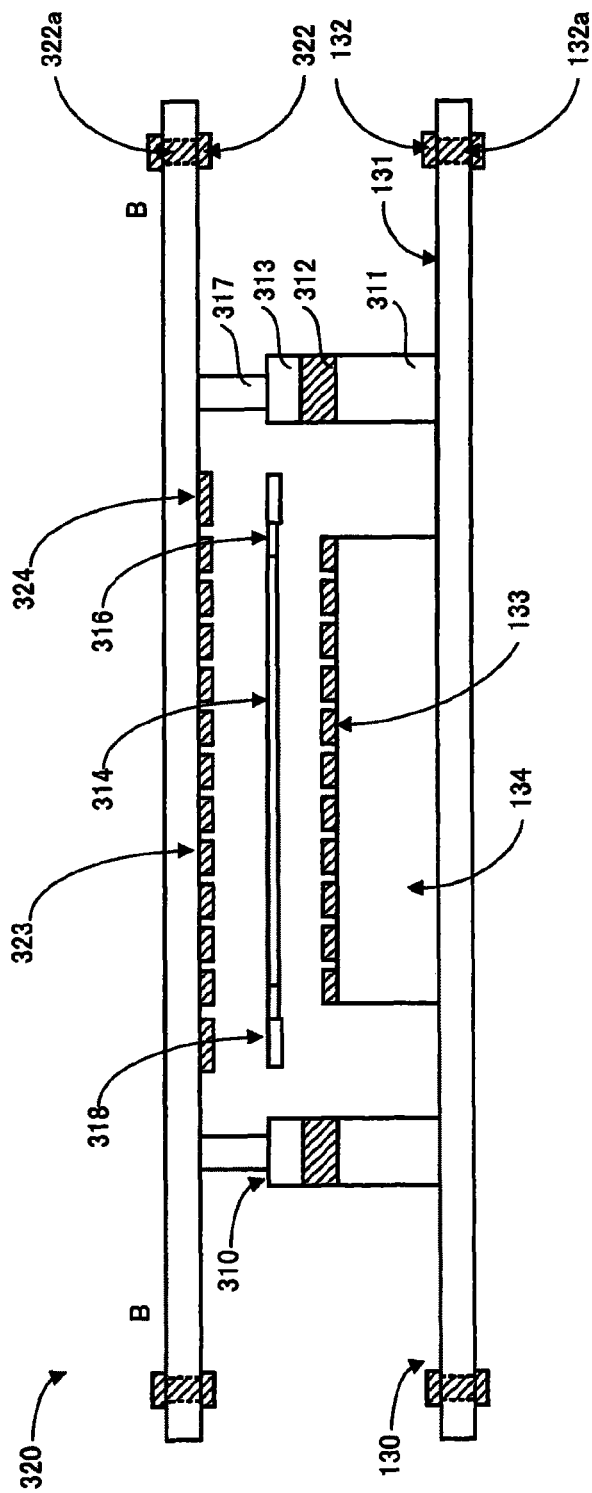
Figure 15:
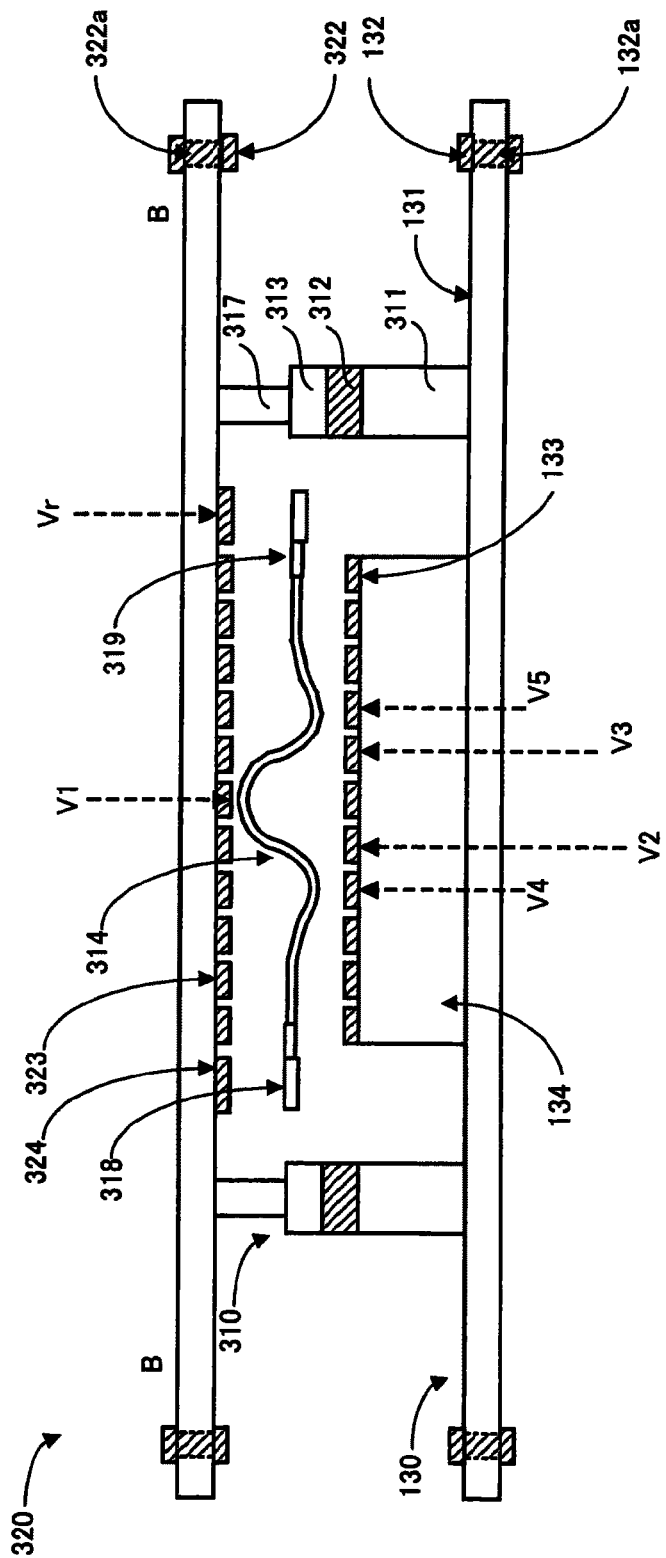
Figure 16:
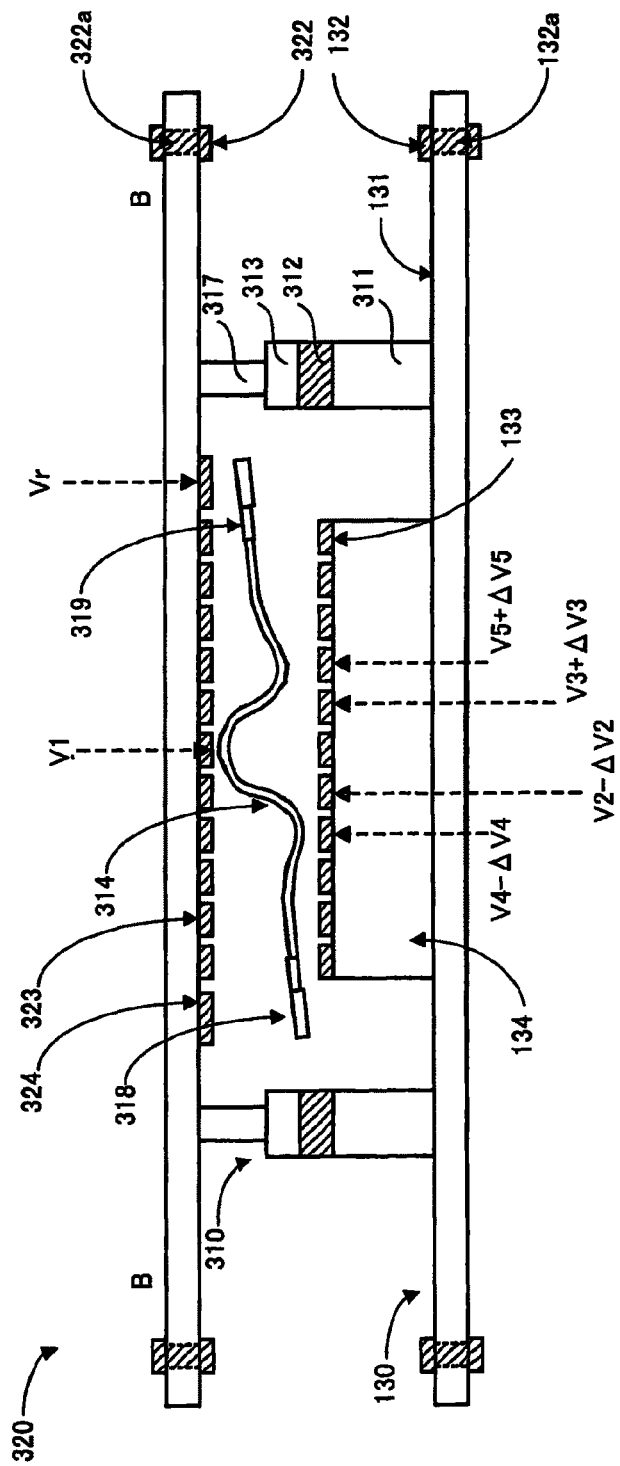
Figure 17:
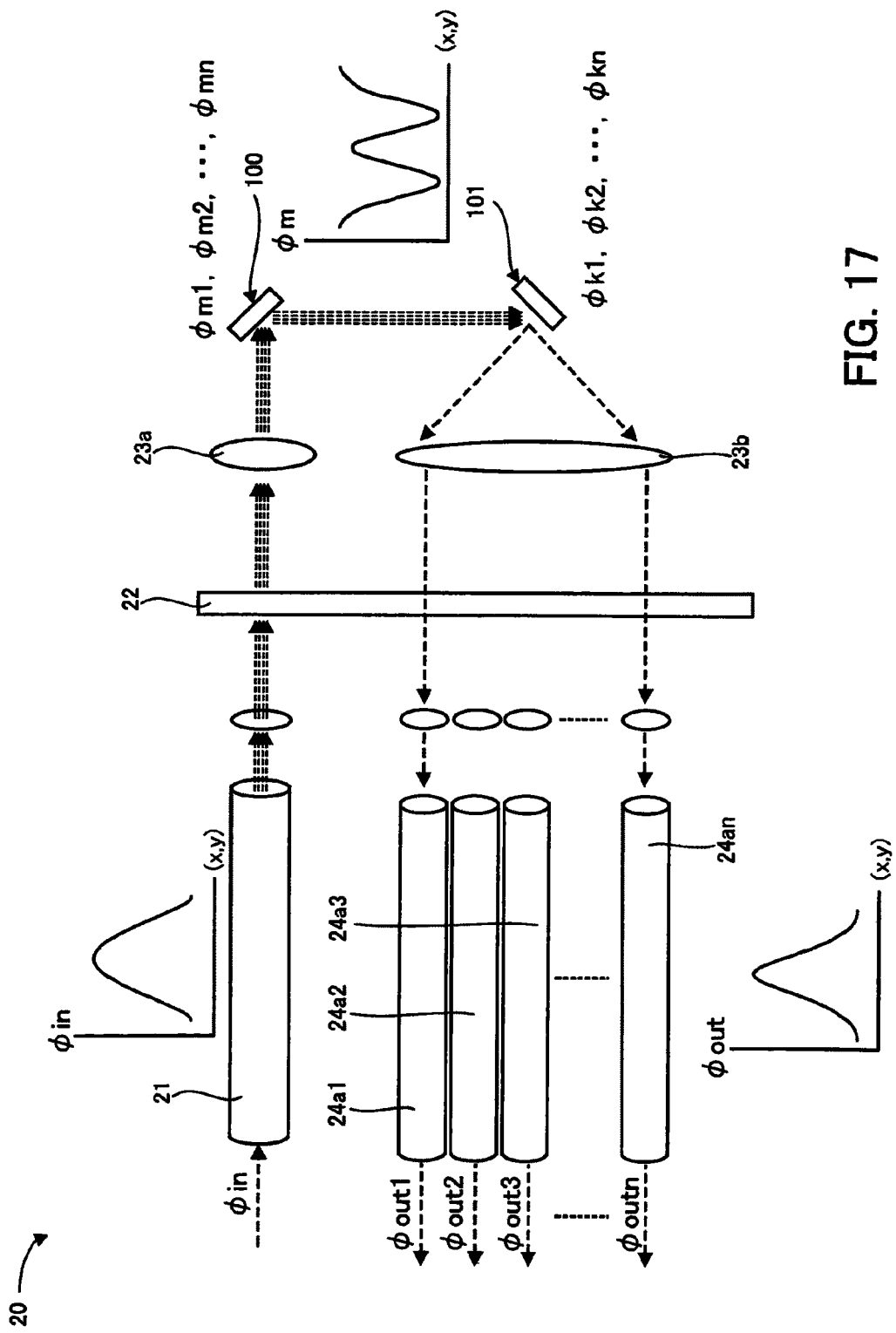
Figure 18:
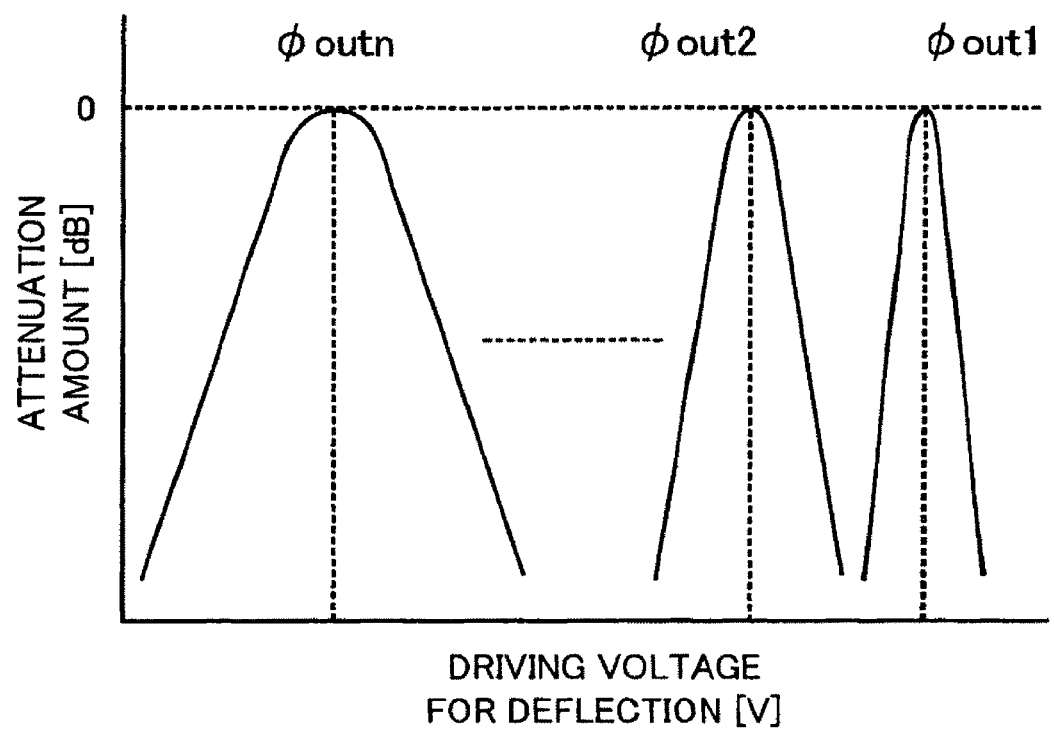
Figure 19:
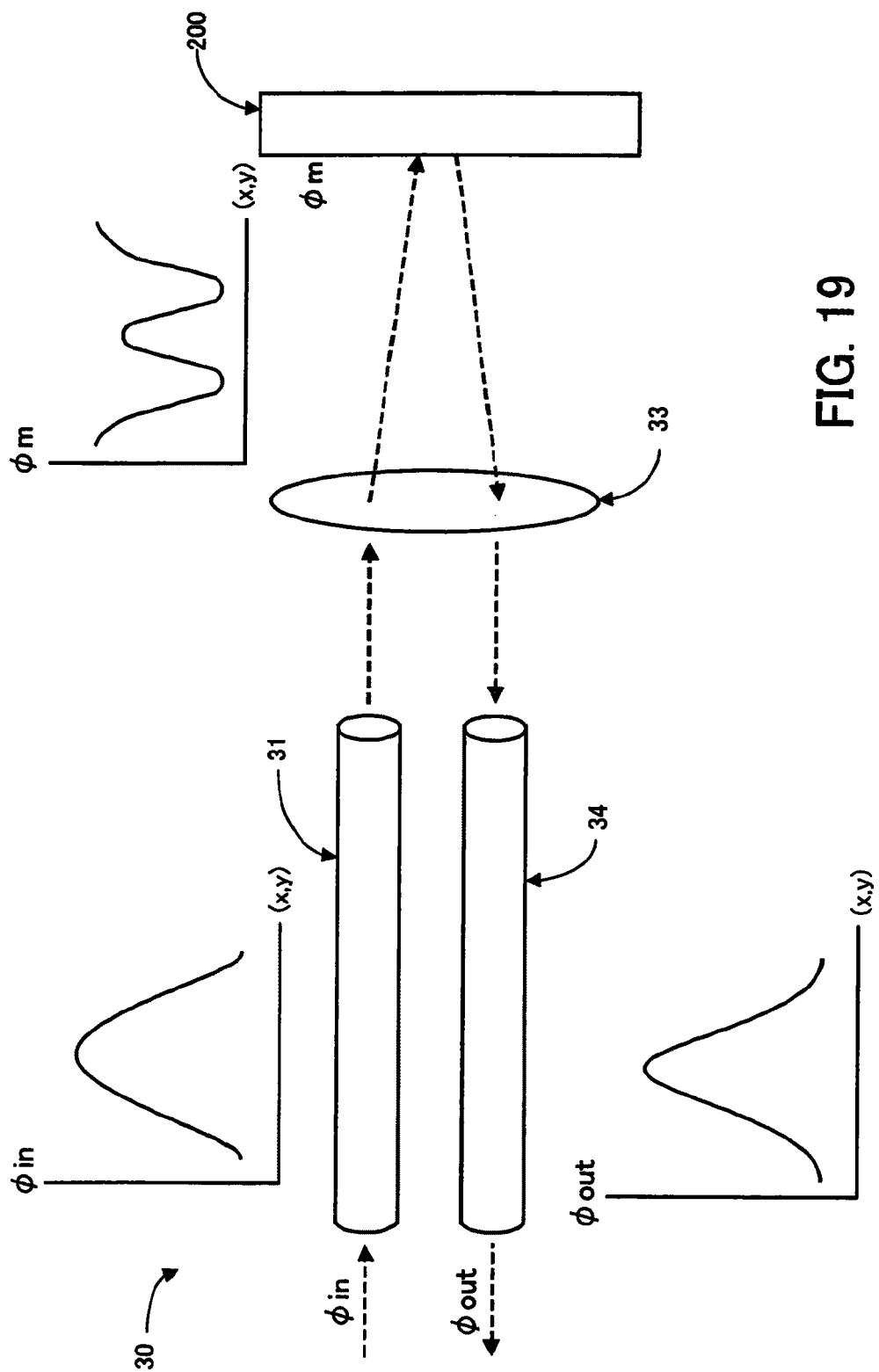
Figure 20A:
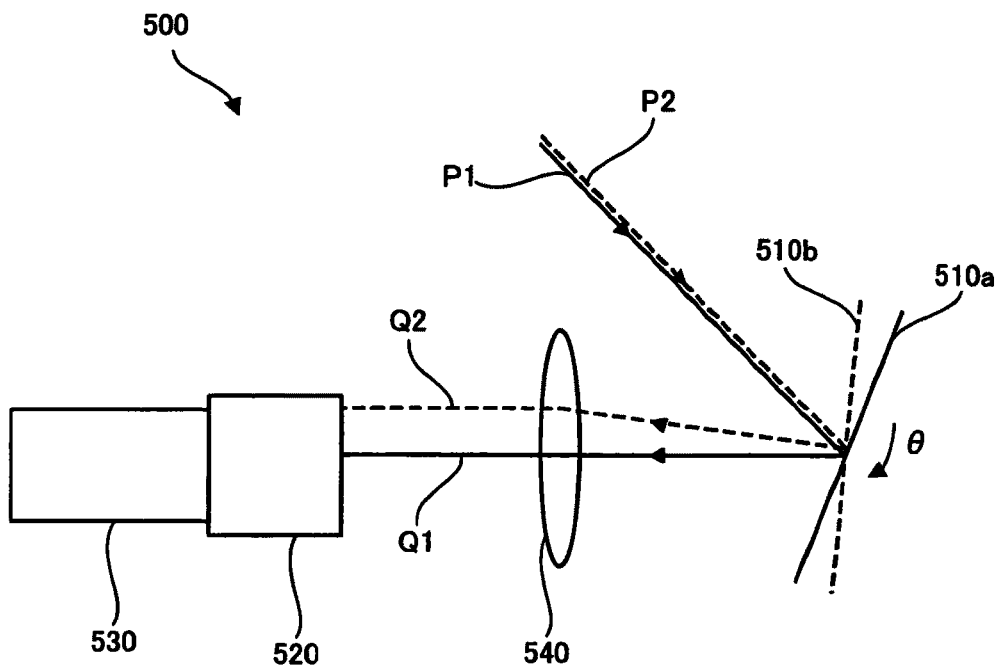
Figure 20B:
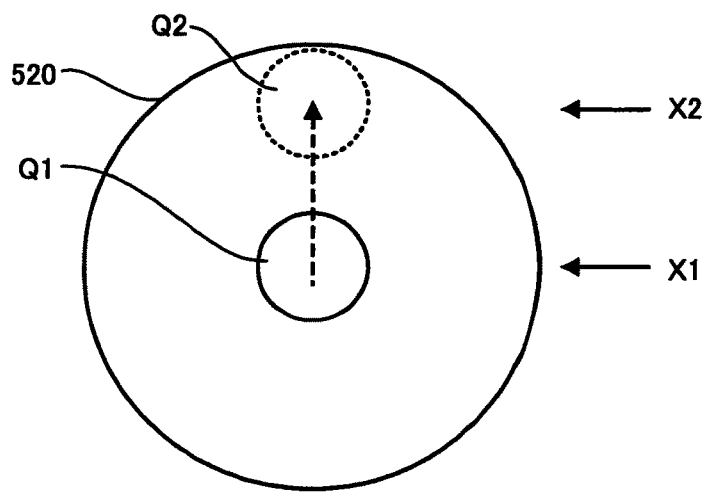
Figure 21:
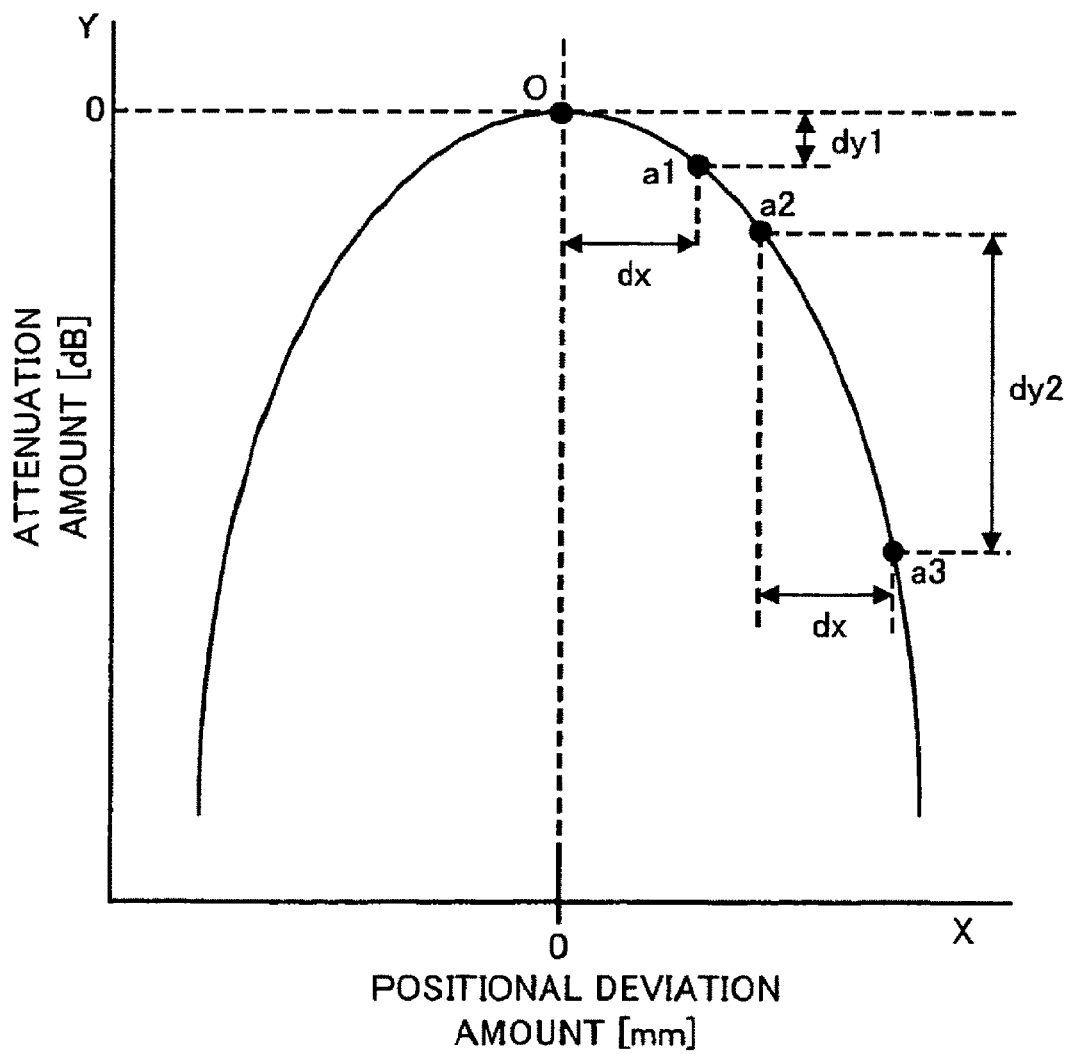

FIGS. 8A, 8B, and 8C are views for describing a process for fabricating the optical module according to the first embodiment (part 1);

FIGS. 9A, 9B, 9C, and 9D are views for describing the process for fabricating the optical module according to the first embodiment (part 2);

FIG. 10 is a plan view of a mirror substrate included in an optical module according to a second embodiment;

FIG. 11 is a sectional view for describing the structure of the optical module according to the second embodiment;

FIGS. 12A and 12B are plan views regarding an optical module according to a third embodiment, FIG. 12A being a plan view of a mirror substrate included in an optical module according to a third embodiment, FIG. 12B being a plan view of an upper glass substrate included in an optical module according to a third embodiment;

FIG. 13 is a sectional view for describing the structure of the optical module according to the third embodiment (part 1);

FIG. 14 is a sectional view for describing the structure of the optical module according to the third embodiment (part 2);

FIG. 15 is a sectional view for describing control of a thin-film mirror included in the optical module according to the third embodiment;

FIG. 16 is a sectional view for describing application of correction voltage to the thin-film mirror included in the optical module according to the third embodiment;

FIG. 17 is a view for describing an optical switch according to a fourth embodiment;

FIG. 18 are graphs each showing an attenuation amount of output light corresponding to driving voltage for deflection in the optical switch according to the fourth embodiment;

FIG. 19 is a view for describing another optical switch according to the fourth embodiment;

FIGS. 20A and 20B are views for describing an optical switch, FIG. 20A being a view for describing a light reflection mechanism of an optical switch, FIG. 20 being a view for describing a surface of a collimating lens of an optical switch to which output light is inputted; and FIG. 21 is a graph showing an attenuation amount corresponding to a positional deviation between a position on a surface to which light is inputted and the center of the surface.

DESCRIPTION OF EMBODIMENT(S)

Embodiments of the present invention will now be described with reference to the accompanying drawings, wherein like reference numerals refer to like elements throughout.

An overview of embodiments of the present invention will be given first.

Figure 1:
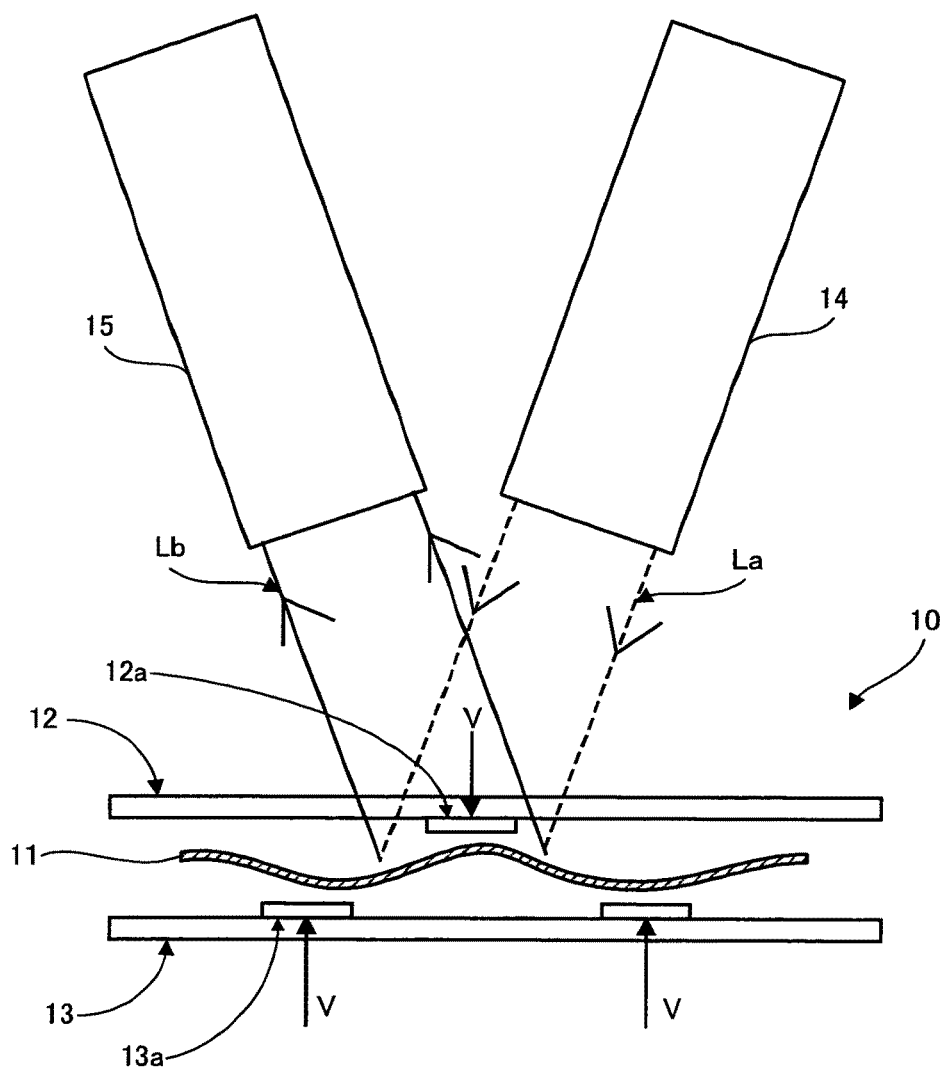
FIG. 1 is a view for giving an overview of embodiments.

FIG. 1 is a view for giving an overview of embodiments.

An optical module 10 comprises a mirror 11 and glass substrates 12 and 13. The mirror 11 is between the glass substrates 12 and 13 and is opposite to each of the glass substrates 12 and 13. As depicted in FIG. 1, electrodes 12a and 13a are formed over the glass substrates 12 and 13 respectively. External control circuits (not depicted) are connected to the electrodes 12a and 13a.

The above optical module 10 reflects input light La inputted and outputs output light Lb which maintains the intensity of the input light La and the optical coupling characteristic of which changes so as to approach a linear characteristic. This change in optical coupling characteristic will now be described.

First the input light la inputted from an input connector 14 passes through the glass substrate 12 and reaches the mirror 11.

At this time control is exercised so that a reflecting surface of the mirror 11 will have a predetermined shape. As a result, the optical coupling characteristic of the output light Lb reflected from the mirror 11 approaches a linear characteristic. The reflecting surface of the mirror 11 is controlled by applying voltage V to the electrodes 12a and 13a with respect to the reflecting surface by the use of control signals sent from the external control circuits and by distorting the reflecting surface of the mirror 11.

The optical coupling characteristic of the output light Lb reflected from the reflecting surface of the mirror 11 which is distorted so as to have a desired shape changes to an approximately linear characteristic and the output light Lb is outputted to an output connector 15.

By controlling the reflecting surface of the mirror 11 in this way, it becomes possible to make the optical coupling characteristic of the output light Lb approach a desired characteristic. If the optical coupling characteristic of the output light Lb approaches a linear characteristic, resistance to an external influence, such as fluctuation in driving voltage or external noise, increases. With the above method, unlike Japanese Laid-open Patent Publication No. 2008-40435, a filter is not used. This avoids an additional decrease in the intensity of light. In addition, the optical coupling characteristic is changed by controlling the shape of the reflecting surface of the mirror 11. Therefore, even if conditions such as the diameter of light change, a desired optical coupling characteristic can be realized. Even after the optical module 10 is assembled, the shape of the reflecting surface of the mirror 11 can be corrected. As a result, by controlling variation in the shape of the reflecting surfaces of the mirrors 11 included in the optical modules 10, the same optical coupling characteristic can be realized in all of the optical modules 10. Furthermore, the shape of the reflecting surface of the mirror 11 can be controlled immediately, so the optical coupling characteristic can be changed with the passage of time.

A change in optical coupling characteristic caused by controlling the shape of light will now be described with reference to the drawings.

Figure 2:
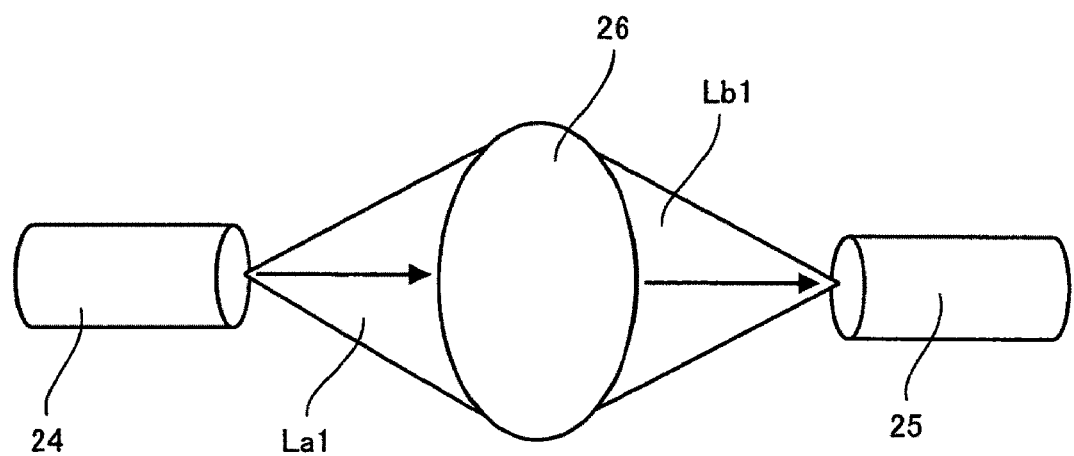
FIG. 2 is a view for describing a method for performing a simulation of an optical coupling characteristic.
Figure 3A:
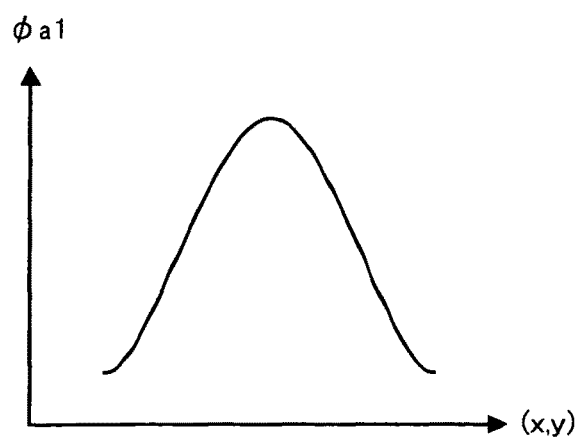
FIGS. 3A and 3B are graphs regarding the simulation of the optical coupling characteristic, FIG. 3A being a graph for describing input light, FIG. 3B being a graph for describing second input light.
Figure 3B:
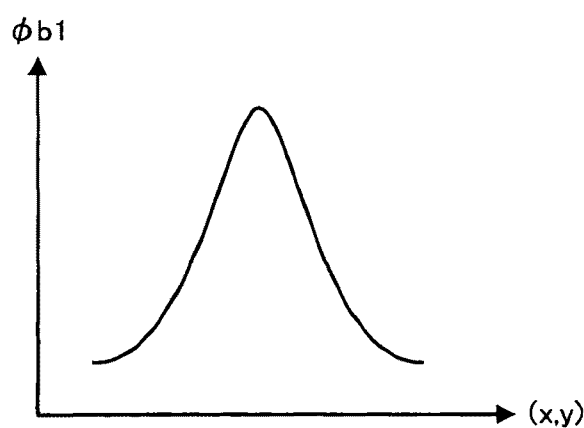

FIG. 2 is a view for describing a method for performing a simulation of an optical coupling characteristic. FIG. 3A is a graph for describing input light used in the simulation of an optical coupling characteristic. FIG. 3B is a graph for describing second input light used in the simulation of an optical coupling characteristic.

As depicted in FIG. 2, input lights La1 of two different types outputted from an optical fiber 24 individually pass through a condensing lens 26 and output lights Lb1 are inputted to an optical fiber 25. By doing so, a simulation of the optical coupling characteristics of the output lights Lb1 is performed. In this case, the simulation software "CODE V" (manufactured by Optical Research Associates) is used. A wavelength is 1,550 nm. The optical fibers 24 and 25 are single-mode fibers and the core radius of the optical fibers 24 and 25 is 5.2 μm. The thickness of the condensing lens 26 is 2 mm. The difference between the condensing lens 26 and each of the optical fibers 24 and 25 is 2 mm. The difference between the optical fibers 24 and 25 is 6 mm.

Shapes expressed by the following functions are used as the input lights La1 used in the simulation. Shapes of the input lights expressed by $\Phi a1$ and $\Phi b1$ are depicted in FIGS. 3A and 3B respectively. In FIG. 3A or 3B, a horizontal axis is an x-axis (or a y-axis) and a vertical axis indicates the intensity of light. Similarly, with the shape of light described later, a horizontal axis is an x-axis (or a y-axis) and a vertical axis indicates the intensity of light.

$$\Phi a1(x,y) = A_1 \exp(-(x^2+y^2)/w_1^2)$$

($A_1$ and $w_1$ are constants) (1)

$$\Phi b_1(x,y) = A_2 \exp(-(\mathrm{sqrt}(x^2+y^2)/w_2^2)$$

($A_2$ and $w_2$ are constants and sqrt is a square root) (2)

Results of the simulation of the optical coupling characteristics of the output lights Lb1 performed under the above conditions will be described.

Figure 4:
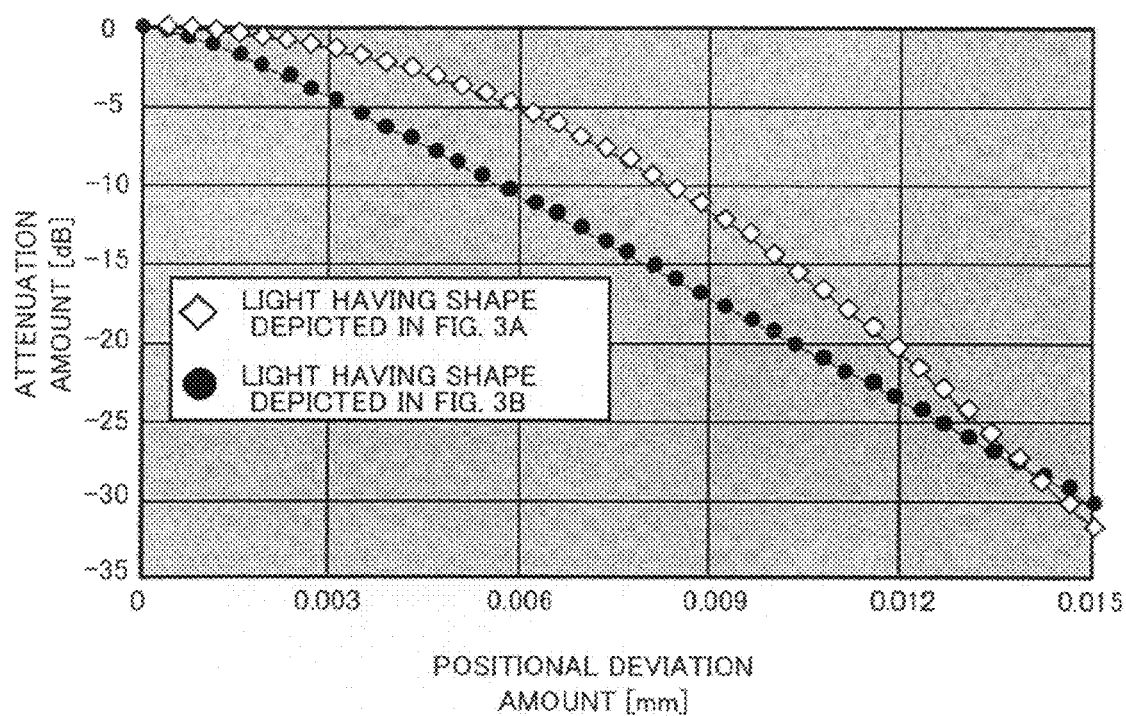
FIG. 4 are graphs showing results of the simulation of the optical coupling characteristics.

FIG. 4 are graphs showing results of the simulation of the optical coupling characteristics.

Each of the graphs plotted in FIG. 4 is showing an attenuation amount of light corresponding to a position on an end of the optical fiber 25 to which the output light Lb1 is inputted. An x-axis indicates a position on the end of the optical fiber 25 to which the output light Lb1 is inputted, that is to say, the amount ([mm]) of a positional deviation from the center (0 on the x-axis) of the end of the optical fiber 25. A y-axis indicates an attenuation amount ([dB]) of light corresponding to a position on the end of the optical fiber 25 to which the output light Lb1 is inputted with the intensity of light at the center of the end of the optical fiber 25 as reference. A mark of ◇ on the graph indicates an attenuation amount of the output light Lb1 obtained by using the input light La1 the shape of which is expressed by $\Phi a1$ and the shape of which is depicted in FIG. 3A. A mark of ● on the graph indicates an attenuation amount of the output light Lb1 obtained by using the input light La1 the shape of which is expressed by $\Phi b1$ and the shape of which is depicted in FIG. 3B.

According to the graph obtained by using the input light La1 the shape of which is expressed by $\Phi a1$, an attenuation amount increases like a quadratic function with an increase in the amount of a positional deviation from the center of the end of the optical fiber 25. With the graph obtained by using the input light La1 the shape of which is expressed by $\Phi b1$, on the other hand, an attenuation amount increases approximately linearly with an increase in the amount of a positional deviation from the center of the end of the optical fiber 25. As a result, compared with the graph obtained by using the input light La1 the shape of which is expressed by $\Phi a1$, the tolerance of a slope of the graph obtained by using the input light La1 the shape of which is expressed by $\Phi b1$ is lessened by about 40 percent at an attenuation amount of, for example, about −20 dB.

As can be seen from FIG. 4, a difference in the shape of light leads to a difference in optical coupling characteristic. In addition, one of shapes of light by which an optical coupling characteristic becomes approximately linear is the shape of light which is expressed by $\Phi b1$ and which is depicted in FIG. 3B. This can be applied to the optical module 10 depicted in FIG. 1. That is to say, control is exercised by the use of the mirror 11 for making the shape of the output light Lb the shape expressed by $\Phi b1$. By doing so, the optical coupling characteristic of the output light Lb can be made linear and an external influence can be reduced.

Furthermore, in order to exercise control for making the shape of the output light Lb the shape expressed by $\Phi b1$, control should be exercised so that the shape of the reflecting surface of the mirror 11 will be a shape expressed by the difference between the shape of the output light Lb expressed by $\Phi b1$ and the shape of input light. For example, if the shape of the input light La is the shape expressed by $\Phi a1$, then the shape of the reflecting surface of the mirror 11 which makes the shape of the output light Lb the shape expressed by $\Phi b1$ is expressed by ($\Phi b1 - \Phi a1$).

Embodiments will now be described.

A first embodiment will be described first.

In the first embodiment descriptions will be given by taking a concrete example of an optical module.

Figure 5:
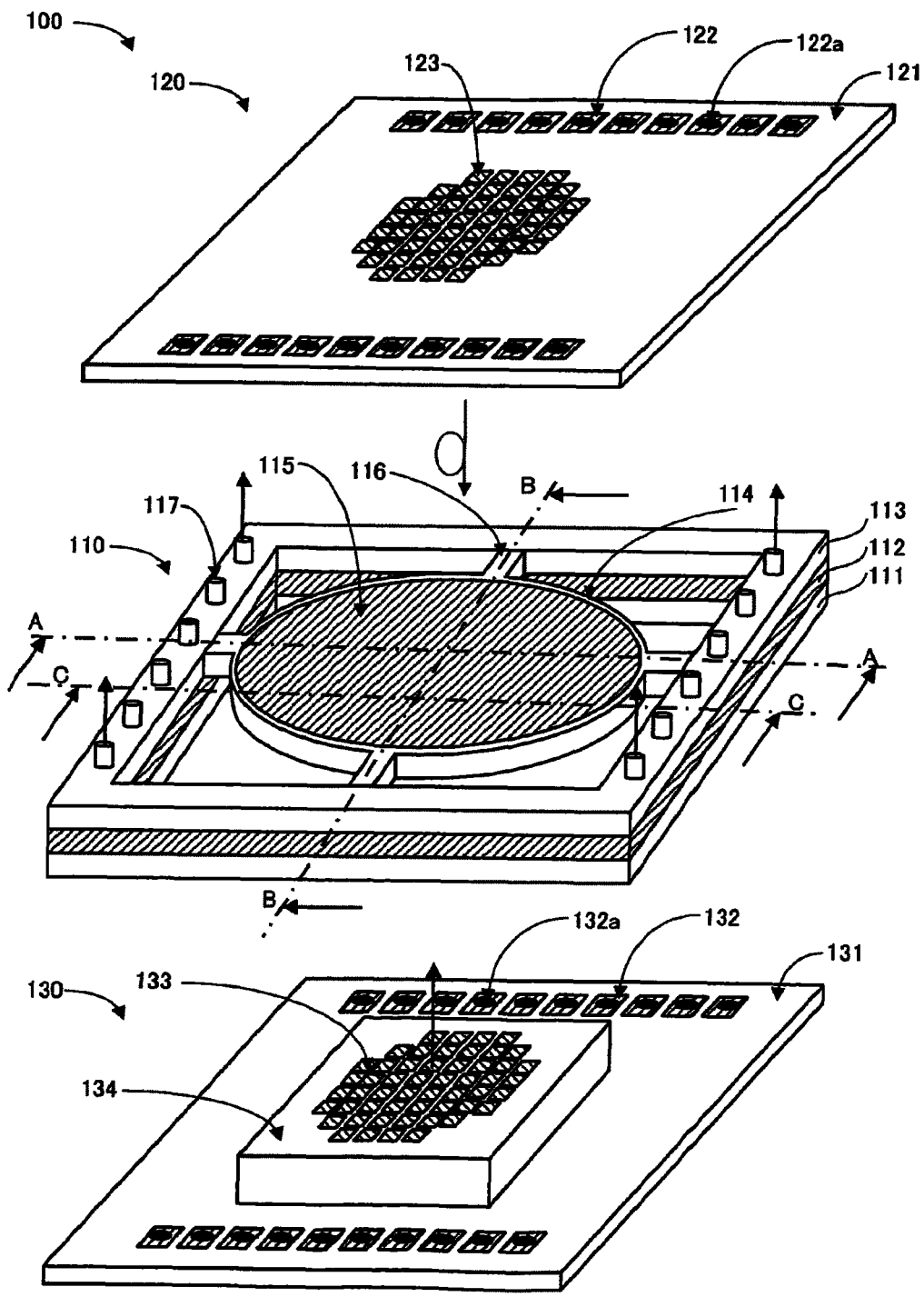
FIG. 5 is a perspective view for describing the structure of an optical module according to a first embodiment.
Figure 6:
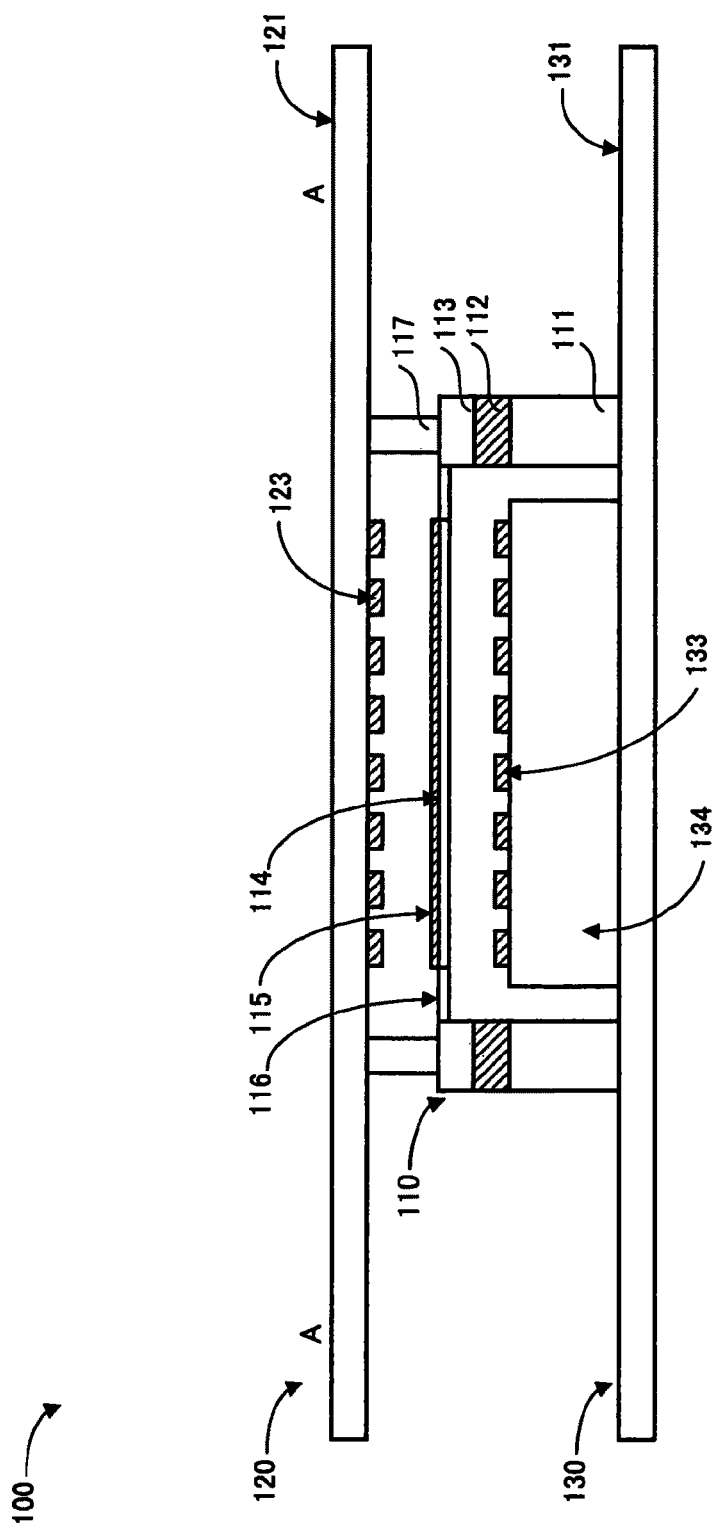
FIG. 6 is a sectional view for describing the structure of the optical module according to the first embodiment (part 1)
Figure 7:
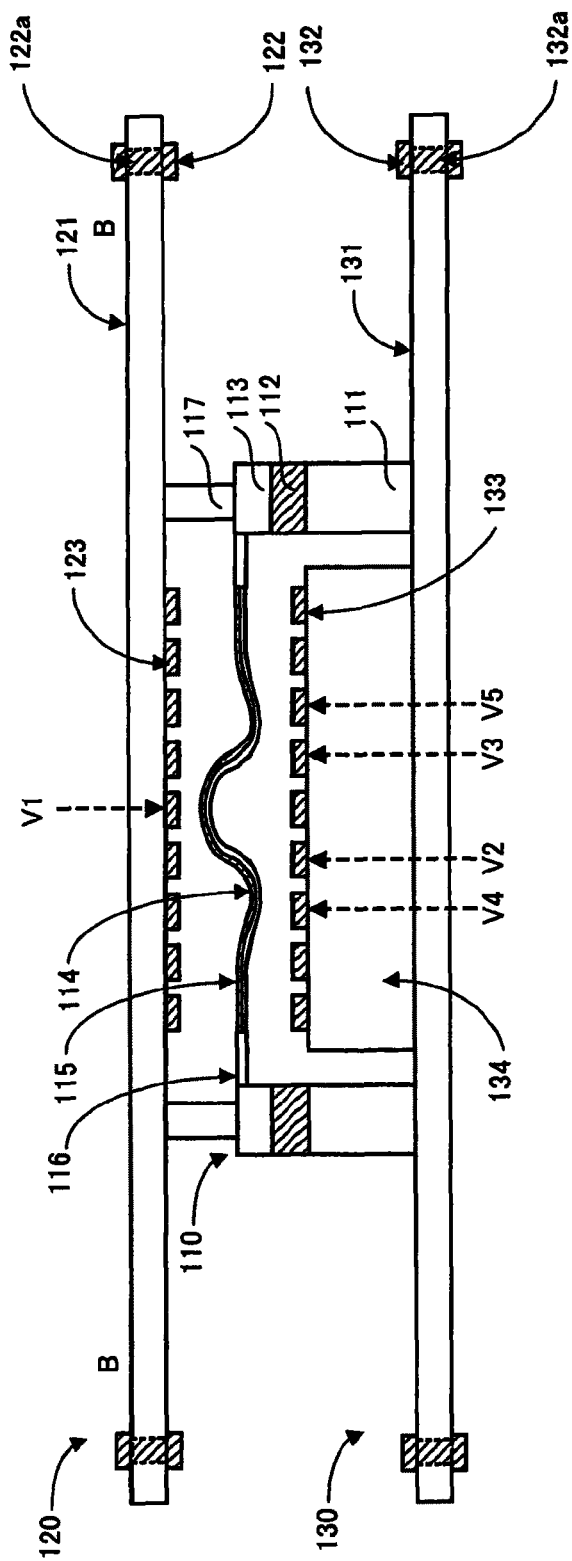
FIG. 7 is a sectional view for describing the structure of the optical module according to the first embodiment (part 2)

FIG. 5 is a perspective view for describing the structure of an optical module according to the first embodiment. FIGS. 6 and 7 are sectional views for describing the structure of the optical module according to the first embodiment.

FIGS. 6 and 7 are sectional views taken along the dot-dash lines A-A and B-B, respectively, of FIG. 5.

An optical module 100 comprises an upper glass substrate 120, a mirror substrate 110, and a lower glass substrate 130 and the mirror substrate 110 is between the upper glass substrate 120 and the lower glass substrate 130.

The mirror substrate 110 has a silicon on insulator (SOI) structure in which a silicon (Si) layer 111, a silicon oxide ($SiO_2$) layer 112, and a Si layer 113 are formed in that order. The inside of the Si layer 111 and the $SiO_2$ layer 112 is removed and the Si layer 111 and the $SiO_2$ layer 112 have the shape of a frame. Inner walls of the Si layer 113, torsion bars 116, and a thin-film mirror 114 are integrally formed. A metal film 115 is formed over a reflecting surface of the thin-film mirror 114 to raise reflectance. In addition, spacers 117 which are solder bumps are formed over a pair of frame portions which are opposite to each other and which are included in the Si layer 113.

The upper glass substrate 120 is joined to the mirror substrate 110 with the spacers 117 between. When the upper glass substrate 120 is joined to the mirror substrate 110, the upper glass substrate 120 depicted in FIG. 5 is reversed and is then joined to the mirror substrate 110. The upper glass substrate 120 includes a glass plate 121 over which electrode pads 122 and control electrodes 123 are formed. A through electrode 122a is formed in each electrode pad 122 and is connected to an external control circuit. Each control electrode 123 is a transparent electrode and is made of, for example, an indium tin oxide (ITO) film. The control electrodes 123 are arranged over the glass plate 121 in order that when the upper glass substrate 120 is joined to the mirror substrate 110, the control electrodes 123 will be opposite to the thin-film mirror 114 and cover the thin-film mirror 114. The control electrodes 123 are connected to the electrode pads 122 by wirings (not depicted). Some control electrodes 123 receive control signals from control circuits via electrode pads 122 and apply voltage.

The lower glass substrate 130 includes a glass plate 131 over the middle of which a projection 134 is placed. Control electrodes 133 are formed over the top of the projection 134 and electrode pads 132 are formed over the glass plate 131. A through electrode 132a is formed in each electrode pad 132 and is connected to an external control circuit. Each control electrode 133 is a transparent electrode and is made of, for example, an ITO film. The control electrodes 133 are arranged over the glass plate 131 in order that when the lower glass substrate 130 is joined to the mirror substrate 110, the control electrodes 133 will be opposite to the thin-film mirror 114 and cover the thin-film mirror 114. The control electrodes 133 are connected to the electrode pads 132 by wirings (not depicted). Some control electrodes 133 receive control signals from control circuits via electrode pads 132 and apply voltage.

As depicted in FIGS. 6 and 7, the upper glass substrate 120 is joined to the mirror substrate 110 with the spacers 117 between. In addition, the projection 134 is fitted into the inside of the framelike Si layer 111 and SiO$_2$ layer 112 of the mirror substrate 110. By doing so, the lower glass substrate 130 is joined to the mirror substrate 110. The optical module 100 is formed in this way.

Control of the reflecting surface of the thin-film mirror 114 (and the metal film 115) included in the optical module 100 will now be described with reference to FIG. 7.

As stated above, the control electrodes 123 are formed over the glass plate 121 of the upper glass substrate 120 and the control electrodes 133 are formed over the glass plate 131 of the lower glass substrate 130. The control electrodes 123 and 133 are opposite to the thin-film mirror 114 (and the metal film 115) and are arranged so as to cover the thin-film mirror 114 (and the metal film 115). The control electrodes 123 and 133 are connected to the electrode pads 122 and 132 formed over the glass plates 121 and 131, respectively, by the wirings. Furthermore, the electrode pads 122 and 132 are connected to the external control circuits (not depicted).

When input light is reflected from the thin-film mirror 114 (and the metal film 115) included in the optical module 100, voltage is applied from control circuits to some control electrodes 123 and 133 via electrode pads 122 and 132. In FIG. 7, for example, voltage V1 is applied to a control electrode 123 arranged in the middle and voltage V2 through V5 is applied to control electrodes 133. By doing so, the reflecting surface of the thin-film mirror 114 (and the metal film 115) is distorted and a desired shape is formed. An optical coupling characteristic is changed to a linear characteristic by the reflecting surface of the thin-film mirror 114 (and the metal film 115) controlled in this way, and output light is outputted.

A method for fabricating the optical module 100 will now be described with reference to the drawings.

FIGS. 8A, 8B, and 8C and FIGS. 9A, 9B, 9C, and 9D are views for describing a process for fabricating the optical module according to the first embodiment. FIGS. 8A, 8B, and 8C and FIGS. 9A, 9B, 9C, and 9D are sectional views of the mirror substrate 110 taken along the dot-dash line C-C of FIG. 5.

First a SOI structure including the Si layer 111, the SiO$_2$ layer 112, and an Si layer 113a is formed.

Then metalization is performed over part of the surface of the Si layer 113a included in the SOI structure by the use of gold (Au)/chromium (Cr) to form the metal film 115 (FIG. 8A).

A photoresist pattern 90 by which a pattern of the thin-film mirror 114 is drawn is formed over part of the Si layer 113a and the metal film 115 included in the SOI structure on which metalization is performed (FIG. 8B).

The photoresist pattern 90 is formed by a widely known conventional method. For example, a photoresist pattern formation region is coated with photoresist by the use of a coater. Exposure is performed on the photoresist to transfer a mask pattern. Heat treatment and development are performed in order. By doing so, a desired photoresist pattern is obtained.

Part of the Si layer 113a is removed by performing deep reaction ion etching (DRIE) with the photoresist pattern 90 by which a pattern of the thin-film mirror 114 is drawn as a mask. By doing so, the inner walls of the Si layer 113, the torsion bars (not depicted in FIG. 8A, 8B, or 8C), and the thin-film mirror 114 are integrally formed. The torsion bars are not depicted in the sectional view taken along the dot-dash line C-C of FIG. 5, but in reality the torsion bars are formed in this step (FIG. 8C).

Figure 9A:
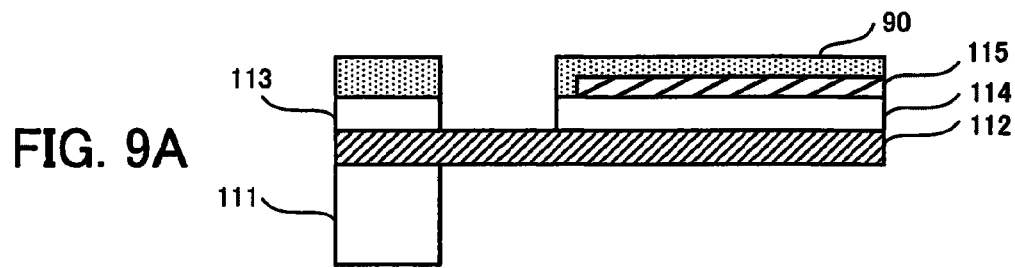

After the Si layer 113a is etched, DRIE is performed again to etch part of the Si layer 111 (FIG. 9A).

Figure 9B:
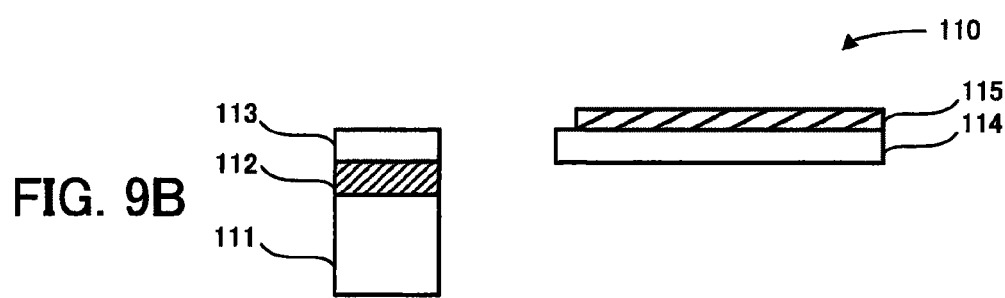

After the part of the Si layer 111 is etched, the photoresist pattern 90 is removed. Part of the SiO$_2$ layer 112 is removed by the use of hydrogen fluoride (HF) to form the mirror substrate 110 (FIG. 9B).

Figure 9C:
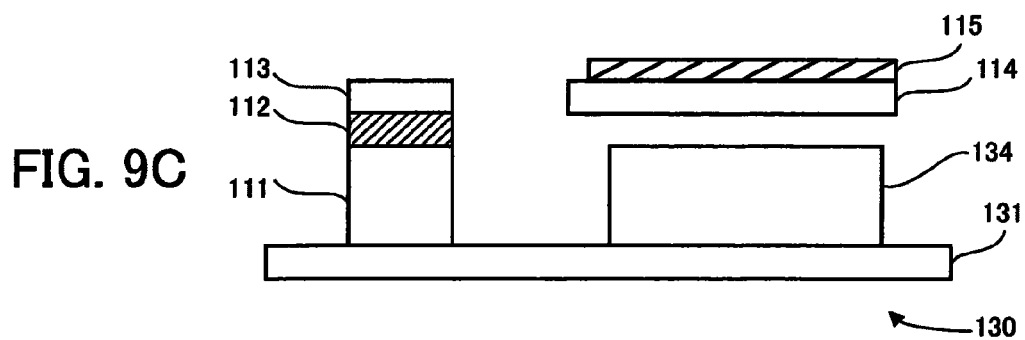

The lower glass substrate 130 with the projection 134 over the middle of the glass plate 131 is joined to the mirror substrate 110. The height of the projection 134 is set so that the projection 134 will not touch the thin-film mirror 114. The electrode pads 132 and the control electrodes 133 formed over the glass plate 131 of the lower glass substrate 130 are not depicted (FIG. 9C).

Figure 9D:
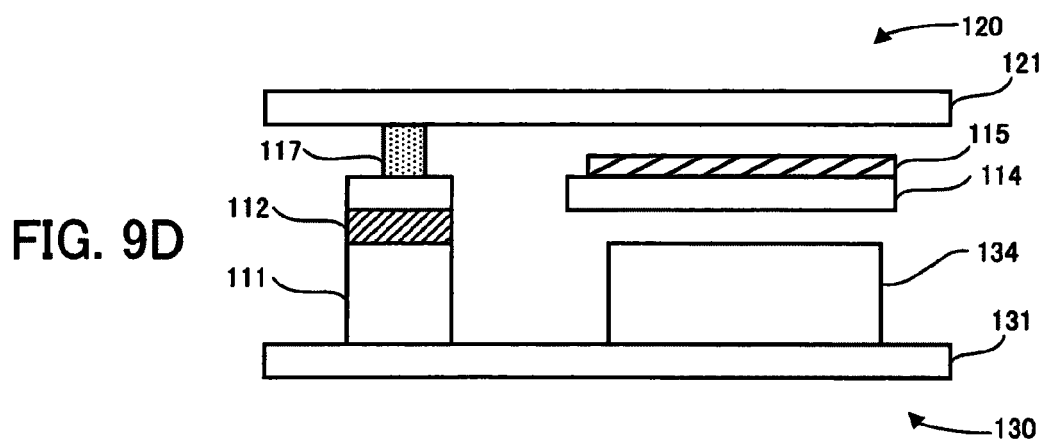

Finally, the upper glass substrate 120 is joined to the mirror substrate 110 with the spacers 117 between. By doing so, the optical module 100 is completed. The electrode pads 122 and the control electrodes 123 formed over the glass plate 121 of the upper glass substrate 120 are not depicted (FIG. 9D).

A second embodiment will now be described.

An optical module according to a second embodiment will be described by taking the case where a thin-film mirror of a mirror substrate is supported only by a pair of torsion bars which are opposite to each other as an example. The structure of an upper glass substrate and a lower glass substrate included in an optical module according to a second embodiment is the same as that of the upper glass substrate 120 and the lower glass substrate 130, respectively, included in the optical module 100 depicted in FIG. 5.

FIG. 10 is a plan view of a mirror substrate included in an optical module according to a second embodiment.

With a mirror substrate 210 included in an optical module, as depicted in FIG. 10, a thin-film mirror 214 supported only by a pair of torsion bars 216 which are opposite to each other is formed inside a Si layer 213. The Si layer 213, the pair of torsion bars 216, and the thin-film mirror 214 are integrally formed. A metal film may be formed over a reflecting surface of the thin-film mirror 214 to raise reflectance. Spacers 217 which are solder bumps, microbeads, or the like are formed over frame portions of the Si layer 213 which extend in a direction perpendicular to a direction in which the thin-film mirror 214 is supported by the pair of torsion bars 216.

The structure of the optical module including the mirror substrate 210 and control of a reflecting surface of the thin-film mirror 214 will now be described with reference to the drawing.

FIG. 11 is a sectional view for describing the structure of the optical module according to the second embodiment.

FIG. 11 is a sectional view taken along the dot-dash line B-B of FIG. 10. A sectional view taken along the dot-dash line A-A of FIG. 10 is the same as that depicted in FIG. 6, so it will be omitted.

An optical module 200 comprises an upper glass substrate 120, the mirror substrate 210, and a lower glass substrate 130 and the mirror substrate 210 is between the upper glass substrate 120 and the lower glass substrate 130.

The mirror substrate 210 has a SOI structure in which a Si layer 211, a $SiO_2$ layer 212, and the Si layer 213 are formed in that order. The inside of the Si layer 211 and the $SiO_2$ layer 212 is removed and the Si layer 211 and the $SiO_2$ layer 212 have the shape of a frame. The thin-film mirror 214 supported only by the pair of torsion bars 216 (which are not depicted in the sectional view taken along the dot-dash line B-B of FIG. 10) which are opposite to each other is formed inside the Si layer 213. In addition, the spacers 217 which are solder bumps are formed over the pair of frame portions which are opposite to each other and which are included in the Si layer 213.

The upper glass substrate 120 and the lower glass substrate 130 are the same as those included in the optical module 100 according to the first embodiment, so detailed descriptions of them will be omitted.

As depicted in FIG. 11, the upper glass substrate 120 is joined to the mirror substrate 210 with the spacers 217 between. In addition, a projection 134 is fitted into the inside of the framelike Si layer 211 and $SiO_2$ layer 212 of the mirror substrate 210. By doing so, the lower glass substrate 130 is joined to the mirror substrate 210. The optical module 200 is formed in this way.

Control of a reflecting surface of the thin-film mirror 214 included in the optical module 200 will be described with reference to FIG. 11.

The thin-film mirror 214 is supported from both sides by the pair of torsion bars 216 inside the Si layer 213. Therefore, the thin-film mirror 214 can be rotated on the pair of torsion bars 216. As a result, not only the optical coupling characteristic of output light but also a direction in which input light is reflected can be controlled (deflected).

When input light is reflected from the thin-film mirror 214 of the optical module 200, some control electrodes 123 and 133 receive control signals from control circuits via electrode pads 122 and 132 and apply voltage to the thin-film mirror 214. In this case, voltage obtained by adding control voltage for tilting the thin-film mirror 214 and control voltage for controlling the shape of the reflecting surface is applied. As depicted in FIG. 11, voltage V1 through Vn obtained by additions are applied to the control electrodes 123 and voltage V(n+1) through V2n obtained by additions are applied to the control electrodes 133. By doing so, the shape of the reflecting surface of the thin-film mirror 214 is changed to a desired shape and a desired tilt is given to the thin-film mirror 214. As a result, the optical coupling characteristic is changed to a linear characteristic and output light is outputted in a desired direction.

A third embodiment will now be described.

In a third embodiment, descriptions will be given by taking the case where a change in the optical coupling characteristic of output light and control of a reflection angle are realized by a mechanism which is different from that of the second embodiment as an example. The structure of a lower glass substrate included in an optical module according to a third embodiment is the same as that of the lower glass substrate included in the optical module 100 depicted in FIG. 5.

FIGS. 12A and 12B are plan views of a mirror substrate and an upper glass substrate, respectively, included in an optical module according to a third embodiment.

With a mirror substrate 310 included in an optical module according to a third embodiment, as depicted in FIG. 12A, a Si frame layer 318 supported only by a pair of torsion bars 319 which are opposite to each other is formed inside a Si layer 313. Inner walls of the Si layer 313, the pair of torsion bars 319, and the Si frame layer 318 are integrally formed. In addition, a thin-film mirror 314 supported from four directions by two pairs of torsion bars 316 is formed inside the Si frame layer 318. Similarly, the Si frame layer 318, the two pairs of torsion bars 316, and the thin-film mirror 314 are integrally formed. Furthermore, a metal film may be formed over a reflecting surface of the thin-film mirror 314 to raise reflectance. Spacers 317 which are solder bumps are formed over a pair of frame portions which are opposite to each other and which are included in the Si layer 313.

As depicted in FIG. 12B, an upper glass substrate 320 included in the optical module includes a glass plate 321 over which electrode pads 322 and control electrodes 323 are formed. A through electrode 322a is formed in each electrode pad 322 and is connected to an external control circuit. Each control electrode 323 is a transparent electrode and is made of, for example, an ITO film. In addition, with the upper glass substrate 320 electrodes 324 are newly formed between the electrode pads 322 and the control electrodes 323. As stated above, the control electrodes 323 are arranged over the glass plate 321 so that when the upper glass substrate 320 is joined to the mirror substrate 310, the control electrodes 323 will be opposite to and cover the thin-film mirror 314. The electrodes 324 are placed over the glass plate 321 so that when the upper glass substrate 320 is joined to the mirror substrate 310, the electrodes 324 will be superimposed over frame portions of the Si frame layer 318 parallel to the pair of torsion bars 319. Not only the control electrodes 323 but also the electrodes 324 are connected to the electrode pads 322 by wirings (not depicted). Voltage is applied to some of the control electrodes 323 and the electrodes 324 by control circuits via electrode pads 322.

The structure of the optical module including the mirror substrate 310 and the upper glass substrate 320 will now be described with reference to the drawings.

FIGS. 13 and 14 are sectional views for describing the structure of the optical module according to the third embodiment.

FIGS. 13 and 14 are sectional views taken along the dot-dash lines A-A and B-B, respectively, of FIG. 12A.

An optical module 300 comprises the upper glass substrate 320, the mirror substrate 310, and a lower glass substrate 130 and the mirror substrate 310 is between the upper glass substrate 320 and the lower glass substrate 130.

The mirror substrate 310 has a SOI structure in which a Si layer 311, a $SiO_2$ layer 312, and the Si layer 313 are formed in that order. The inside of the Si layer 311 and the $SiO_2$ layer 312 is removed and the Si layer 311 and the $SiO_2$ layer 312 have the shape of a frame. As stated above, the Si frame layer 318 supported only by the pair of torsion bars 319 which are opposite to each other is formed inside the Si layer 313. In addition, the thin-film mirror 314 supported from the four directions by the two pairs of torsion bars 316 is formed inside the Si frame layer 318.

As stated above, the upper glass substrate 320 differs from the upper glass substrate included in the optical module according to the first or second embodiment in that the electrodes 324 are formed between the electrode pads 322 and the control electrodes 323.

The structure of the lower glass substrate 130 is the same as that of the lower glass substrate included in the optical module according to the first or second embodiment, so detailed descriptions of it will be omitted.

As depicted in FIGS. 13 and 14, the upper glass substrate 320 is joined to the mirror substrate 310 with the spacers 317 between. In addition, a projection 134 is fitted into the inside of the framelike Si layer 311 and SiO$_2$ layer 312 of the mirror substrate 310. By doing so, the lower glass substrate 130 is joined to the mirror substrate 310. The optical module 300 is formed in this way.

Control of a reflecting surface of the thin-film mirror 314 of the optical module 300 including the mirror substrate 310 and the upper glass substrate 320 will now be described with reference to the drawings.

FIG. 15 is a sectional view for describing control of the thin-film mirror included in the optical module according to the third embodiment. FIG. 16 is a sectional view for describing application of correction voltage to the thin-film mirror included in the optical module according to the third embodiment.

When input light is reflected from the thin-film mirror 314, voltage is applied from some control electrodes 323 and 133 to the thin-film mirror 314 by control circuits via electrode pads 322 and 132. By doing so, the shape of the reflecting surface of the thin-film mirror 314 is controlled. The optical coupling characteristic of output light after reflection changes to a linear characteristic and the output light is outputted. As depicted in FIG. 15, for example, optimum voltage is applied for outputting output light the optical coupling characteristic of which is a linear characteristic. That is to say, voltage V1 is applied to a control electrode 323 and voltage V2 through V5 are applied to control electrodes 133.

In addition, in order to control a direction in which the output light is outputted, voltage is applied from the electrodes 324 to the Si frame layer 318 by control circuits via electrode pads 322 and 132. By doing so, the Si frame layer 318 is rotated on the pair of torsion bars 319. On the other hand, the thin-film mirror 314 approaches the control electrodes 323 or 133 when the Si frame layer 318 tilts. As a result, the optimum voltage changes. As depicted in FIG. 16, if the thin-film mirror 314 approaches the control electrodes 133, then the voltage V2 and V4 are decreased to, for example, V2−ΔV2 and V4−ΔV4, respectively, to move the thin-film mirror 314 away from the control electrodes 133. Correction voltage is added to increase the voltage V3 and V5 to, for example, V3+ΔV3 and V5+ΔV5 respectively. By doing so, a desired shape of the reflecting surface of the thin-film mirror 314 is maintained. In addition, control is exercised to give the thin-film mirror 314 a desired tilt. As a result, an optical coupling characteristic changes to a linear characteristic and output light is outputted in a desired direction.

A fourth embodiment will now be described.

In a fourth embodiment descriptions will be given by taking examples to which the optical module according to the first, second, or third embodiment is applied.

In a fourth embodiment, it is assumed that the shape of input light is Φa1 expressed by expression (1) described in FIG. 3A and that the shape of output light is Φb1 expressed by expression (2) described in FIG. 3B. Accordingly, it is assumed that control is exercised so that a reflecting surface of a thin-film mirror of an optical module will have a shape expressed by Φm=Φb1−Φa1.

Example 4-1

FIG. 17 is a view for describing an optical switch according to a fourth embodiment.

An optical switch system 20 comprises an input port 21, a spectral element 22, condensing optical systems 23a and 23b, output ports 24a1, 24a2, . . . , and 24an, the optical modules 100 according to the first embodiment, and deflection mirrors 101. The optical module 100 and a deflection mirror 101 form a group and the number of groups corresponds to the number (n) of wavelengths multiplexed in input light. In addition, driving voltage is applied to each deflection mirror 101. That is to say, the deflection angle of each deflection mirror 101 changes according to driving voltage for deflection.

When input light Φin in which n wavelengths are multiplexed is inputted via the input port 21, the input light Φin is separated into n light components with different wavelengths by the spectral element 22. The n light components are condensed by the condensing optical system 23a and are inputted to the optical modules 100 corresponding to the n different wavelengths. Control is exercised in advance so that reflecting surfaces of the optical modules 100 will have shapes expressed by Φb1−Φa1, that is to say, by Φm1, . . . , and Φmn. As a result, the optical modules 100 change the optical coupling characteristics of the light components to linear characteristics. The light components outputted from the optical modules 100 are reflected from the deflection mirrors 101 corresponding to the n different wavelengths in directions Φk1, . . . , and Φkn corresponding to the output ports 24a1, 24a-2, . . . , and 24an. Then the light components are condensed by the condensing optical system 23b. Output light Φout1, Φout2, . . . , and Φoutn which differ in wavelength are inputted to the output ports 24a1, 24a2, . . . , and 24an, respectively, and are outputted therefrom.

An attenuation amount of output light corresponding to driving voltage applied to a deflection mirror 101 included in the optical switch system 20 having the above structure will be described with reference to the drawing.

FIG. 18 are graphs each showing an attenuation amount of output light corresponding to driving voltage for deflection in the optical switch according to the fourth embodiment. In FIG. 18, an x-axis indicates driving voltage for deflection ([V]) applied for deflecting a deflection mirror 101 and a y-axis indicates an attenuation amount ([dB]) of each output light corresponding to driving voltage for deflection with the intensity of light at the center of an end of an output fiber as reference.

According to these graphs, as "n" of the output light Φoutn becomes smaller, driving voltage for deflection (optimum voltage) at which an attenuation amount ([dB]) of output light Φout is minimized increases. Moreover, with the output light Φout1, for example, an attenuation amount is minimized at optimum voltage. As the driving voltage for deflection increases or decreases, the attenuation amount increases linearly. The same applies to the other output lights. Therefore, by using the optical modules 100, the optical coupling characteristics of the output lights change to linear characteristics and fluctuations in driving voltage for deflection caused by an external influence can be made narrow.

In example 4-1, the case where the optical modules 100 and the deflection mirrors 101 are used for performing selective switching of the wavelength-multiplexed input light Φin is described. The optical modules 200 or 300 may be used in place of the optical modules 100. If the optical modules 200 or 300 are used, it is possible to not only change optical coupling characteristics but also control deflection angles. As a result, by using the optical modules 200 or 300, output lights the optical coupling characteristics of which are changed can be inputted directly to output ports. That is to say, there is no need to arrange the deflection mirrors 101.

Example 4-2

FIG. 19 is a view for describing another optical switch according to the fourth embodiment.

An optical switch system 30 comprises an input fiber 31, a condensing optical system 33, an output fiber 34, and the optical module 200 according to the second embodiment. In this case, the optical module 300 according to the third embodiment may be used in place of the optical module 200.

When input light $\Phi in$ is inputted via the input fiber 31, the input light $\Phi in$ is condensed by the condensing optical system 33 and is inputted to the optical module 200. Control is exercised in advance so that the reflecting surface of the optical module 200 will have a shape expressed by $\Phi m=\Phi b1-\Phi a1$ described in FIGS. 2 and 3. The optical module 200 changes the optical coupling characteristic of output light $\Phi out$ to a linear characteristic. In addition, the optical module 200 controls the deflection of the output light $\Phi out$ so that the output light $\Phi out$ will be inputted to the output fiber 34. The optical coupling characteristic of the output light $\Phi out$ outputted from the optical module 200 is changed to a linear characteristic and the output light $\Phi out$ is reflected in the direction of the output fiber 34. Then the output light $\Phi out$ is condensed by the condensing optical system 33, is inputted to the output fiber 34, and is outputted therefrom.

By using the optical module 200 (or 300) in this way, the optical coupling characteristic of input light can be changed to a linear characteristic and output light can be outputted in a desired direction.

In the above example 4-1 or 4-2, control is exercised in advance so that the reflecting surface of the thin-film mirror will have a desired shape. Then output light the optical coupling characteristic of which has changed is outputted. However, it is possible to monitor output light and to control the reflecting surface of the thin-film mirror so that the output light will have a desired shape.

As has been described in the foregoing, if the optical coupling characteristic of output light approaches a linear characteristic by controlling the reflecting surface of the thin-film mirror, resistance to an external influence, such as fluctuation in driving voltage or external noise, increases. The above method does not cause an additional decrease in the intensity of light because reflection by the thin-film mirror is used. In addition, an optical coupling characteristic is changed by controlling the shape of the reflecting surface of the thin-film mirror. Therefore, even if conditions such as the diameter of light change, a desired optical coupling characteristic can be realized. Even after the optical module is assembled, the shape of the reflecting surface of the thin-film mirror can be corrected. As a result, by controlling variation in the shape of the reflecting surfaces of the thin-film mirrors included in the optical modules, the same optical coupling characteristic can be realized in all of the optical modules. Furthermore, the shape of the reflecting surface of the thin-film mirror can be controlled immediately, so the optical coupling characteristic can be changed with the passage of time.

With the above optical modules, a decrease in the intensity of light is checked and stable light is outputted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions, and alterations could be made hereto without departing from the spirit and scope of the invention.

What is claimed is:

1. An optical module for reflecting input light, the module comprising:
   a mirror having a surface for reflecting the input light as output light; and
   a mirror control section, including an upper glass substrate and a lower glass substrate with the mirror placed between the upper and lower glass substrates
   wherein, when the input light is being reflected by the reflecting surface, the mirror control section controls an application of voltage to the mirror to distort the reflecting surface and thereby change an optical coupling characteristic of the output light; and
   a plurality of control electrodes provided on each of the upper and lower glass substrates and facing the mirror,
   wherein the mirror control section applies the voltage via the plurality of control electrodes, and
   wherein the distorted reflecting surface has a shape obtained from a difference between a shape of the output light and a shape of the input light.

2. The optical module according to claim 1,
   wherein the optical coupling characteristic indicates an attenuation amount of the output light caused by a positional deviation between a center of a surface to which the output light is inputted and a position to which the output light is inputted, and an attenuation amount of the output light caused by a positional deviation in the optical coupling characteristic varies linearly.

3. The optical module according to claim 1, further comprising:
   wherein the mirror control section distorts and tilts the reflecting surface by applying the voltage so as to reflect the output light with the changed optical coupling characteristic and a changed output direction.

4. The optical module according to claim 1, further comprising:
   a mirror substrate having a first frame-like silicon layer, a frame-like silicon oxide layer, and a second framelike silicon layer having inner walls integrally formed with the mirror by a plurality of torsion bars between the inner walls and the mirror,
   wherein the mirror control section includes:
   the upper glass substrate having a principal plane with first electrode pads connected to external control circuits and first control electrodes connected to the first electrode pads by first wirings, the first control electrodes facing the mirror, and the principal plane is joined to the second frame-like silicon layer with spacers therebetween; and
   the lower glass substrate having a principal plane with second electrode pads connected to the external control circuits and a projection having a top with second control electrodes connected to the second electrode pads by second wirings, the second control electrodes facing the mirror, and the principal plane is joined to the mirror substrate.

5. The optical module according to claim 3, further comprising:
a mirror substrate having a first frame-like silicon layer, a frame-like silicon oxide layer, and a second frame-like silicon layer having inner walls integrally formed with the mirror by a pair of torsion bars opposite to each other,
wherein the mirror control section includes:
the upper glass substrate having a principal plane with first electrode pads connected to external control circuits and first control electrodes connected to the first electrode pads by first wirings, the first control electrodes facing the mirror, and the principal plane is joined to the second frame-like silicon layer with spacers therebetween; and
the lower glass substrate having a principal plane with second electrode pads connected to the external control circuits and a projection over a top of which second control electrodes connected to the second electrode pads by second wirings, the second control electrodes being opposite to the mirror, and the principal plane is joined to the mirror substrate.

6. The optical module according to claim 3, further comprising;
a mirror substrate having a first frame-like silicon layer, a frame-like silicon oxide layer, and a second frame-like silicon layer having inner walls integrally formed with the first frame-like silicon layer by a pair of torsion bars opposite to each other, and the first frame-like silicon layer having inner walls integrally formed with the mirror by a plurality of torsion bars,
wherein the mirror control section includes:
the upper glass substrate having a principal plane with first electrode pads connected to external control circuits, electrodes connected to the first electrode pads by first wirings, and first control electrodes connected to the first electrode pads by second wirings, the electrodes connected by the first wirings being superimposed over the first frame-like silicon layer, and the principal plane is joined to the second frame-like silicon layer with spacers therebetween, and the first control electrodes facing the mirror; and
the lower glass substrate having a principal plane with second electrode pads connected to the external control circuits and a projection with second control electrodes connected to the second electrode pads by third wirings, the second control electrodes facing the mirror, and the principal plane is joined to the mirror substrate.

7. The optical module according to claim 4, wherein the first control electrodes and the second control electrodes are made of indium tin oxide.

8. A method for controlling an optical module for reflecting input light, the method comprising:
distorting a reflecting surface of a mirror by applying voltage to the mirror with a mirror control section, including an upper glass substrate and a lower glass substrate with the mirror placed between the upper and lower glass substrates thereby changing, when the input light is being reflected from the mirror as an output light, an optical coupling characteristic of the output light;
providing a plurality of control electrodes on each of the upper and lower glass substrates facing the mirror, wherein the applying of the voltage is via the plurality of control electrodes; and
obtaining a shape of the distorted reflecting surface from a difference between a shape of the output light and a shape of the input light.

9. An optical switch for performing selective switching of wavelength-multiplexed input light according to wavelengths, the switch comprising:
an input port to which the input light is inputted;
a spectral element which separates the input light inputted to the input port;
a plurality of optical modules arranged according to the wavelengths of light components into which the spectral element separates the input light,
wherein each module includes a mirror with a reflecting surface that reflects the light components as respective output lights, and a mirror control section, including an upper glass substrate and a lower glass substrate with the mirror placed between the upper and lower glass substrates;
a plurality of control electrodes provided on each of the upper and lower glass substrates and facing the mirror,
wherein, when the light components are being reflected from the reflecting surface, the mirror control section controls an application of voltage to the mirror to distort the reflecting surface and thereby change an optical coupling characteristic of the output lights,
wherein the mirror control section applies the voltage via the plurality of control electrodes, and
wherein the distorted reflecting surface has a shape obtained from a difference between a shape of the output light and a shape of the input light;
a plurality of deflection mirrors which are arranged according to the wavelengths, and reflect the output lights reflected from the plurality of optical modules; and
a plurality of output ports which are arranged according to the wavelengths and to which the output lights reflected from the plurality of deflection mirrors are inputted.

10. The optical switch according to claim 9, wherein the optical characteristic indicates an attenuation amount of the output light caused by a positional deviation between a center of a surface to which the output light is inputted and a position to which the output light is inputted, and an attenuation amount of the output light caused by a positional deviation in the optical coupling characteristic varies linearly.

11. The optical switch according to claim 9, wherein the mirror control section distorts and tilts the reflecting surface according to the voltage applied to the mirror so as to change the optical coupling characteristic and change an output direction directly to each of the plurality of output ports.

12. An optical switching method for performing selective switching of wavelength-multiplexed input light according to wavelengths, the method comprising:
providing a plurality of control electrodes on each of upper and lower glass substrates of a mirror control section to face the mirror,
wherein the mirror control section applies a voltage via the plurality of control electrodes,
outputting, in each of a plurality of optical modules arranged according to the wavelengths of light components into which the input light inputted to an input port is separated by a spectral element, output light, an optical coupling characteristic of which changes by distorting a reflecting surface of the mirror according to the voltage applied to the mirror, when the output lights are reflected from the mirror;
wherein the distorted reflecting surface has a shape obtained from a difference between a shape of the output light and a shape of the input light;
further reflecting the output lights from each of the plurality of optical modules by each of a plurality of deflection mirrors arranged according to the wavelengths; and inputting the output light reflected from each of the plurality of deflection mirrors to each of a plurality of output ports arranged according to the wavelengths.

13. An optical module for reflecting input light, the module comprising:
   a mirror having a surface for reflecting the input light as output light; and
   a mirror control section, including an upper glass substrate and a lower glass substrate with the mirror placed between the upper and lower glass substrates,
   wherein, when the input light is being reflected by the reflecting surface, the mirror control section controls an application of voltage to the mirror to distort the reflecting surface and thereby change an optical coupling characteristic of the output light;
   a mirror substrate having a first frame-like silicon layer, a frame-like silicon oxide layer, and a second framelike silicon layer having inner walls integrally formed with the mirror by a plurality of torsion bars,
   wherein the upper glass substrate has a principal plane with first electrode pads connected to external control circuits and first control electrodes connected to the first electrode pads by first wirings, the first control electrodes facing the mirror, and the principal plane is joined to the second frame-like silicon layer with spacers therebetween, and the lower glass substrate has a principal plane with second electrode pads connected to the external control circuits and a projection having a top with second control electrodes connected to the second electrode pads by second wirings, the second control electrodes facing the mirror, and the principal plane is joined to the mirror substrate.

14. The optical module according to claim 13, wherein the first control electrodes and the second control electrodes are made of indium tin oxide.

15. An optical module for reflecting input light, the module comprising:
   a mirror having a surface for reflecting the input light as output light; and
   a mirror control section, including an upper glass substrate and a lower glass substrate with the mirror placed between the upper and lower glass substrates,
   a plurality of control electrodes provided on each of the upper and lower glass substrates and facing the mirror,
   wherein, when the input light is being reflected by the reflecting surface, the mirror control section controls an application of voltage to the mirror to distort the reflecting surface and thereby change an optical coupling characteristic of the output light,
   wherein the mirror control section applies the voltage via the plurality of control electrodes, and
   wherein the mirror control section distorts and tilts the reflecting surface by applying the voltage so as to reflect the output light with the changed optical coupling characteristic and a changed output direction; and
   a mirror substrate having a first frame-like silicon layer, a frame-like silicon oxide layer, and a second frame-like silicon layer having inner walls integrally formed with the mirror by a pair of torsion bars opposite to each other,
   wherein the upper glass substrate has a principal plane with first electrode pads connected to external control circuits and first control electrodes connected to the first electrode pads by first wirings, the first control electrodes facing the mirror, and the principal plane is joined to the second frame-like silicon layer with spacers therebetween, and the lower glass substrate has a principal plane with second electrode pads connected to the external control circuits and a projection over a top of which second control electrodes connected to the second electrode pads by second wirings, the second control electrodes being opposite to the mirror, and the principal plane is joined to the mirror substrate.

16. An optical module for reflecting input light, the module comprising:
   a mirror having a surface for reflecting the input light as output light; and
   a mirror control section, including an upper glass substrate and a lower glass substrate with the mirror placed between the upper and lower glass substrates;
   a plurality of control electrodes provided on each of the upper and lower glass substrates and facing the mirror,
   wherein, when the input light is being reflected by the reflecting surface, the mirror control section controls an application of voltage to the mirror to distort the reflecting surface and thereby change an optical coupling characteristic of the output light,
   wherein the mirror control section applies the voltage via the plurality of control electrodes, and
   wherein the mirror control section distorts and tilts the reflecting surface by applying the voltage so as to reflect the output light with the changed optical coupling characteristic and a changed output direction; and
   a mirror substrate having a first frame-like silicon layer, a frame-like silicon oxide layer, and a second frame-like silicon layer having inner walls integrally formed with the first frame-like silicon layer by a pair of torsion bars opposite to each other, and the first frame-like silicon layer having inner walls integrally formed with the mirror by a plurality of torsion bars,
   wherein the upper glass substrate has a principal plane with first electrode pads connected to external control circuits, electrodes connected to the first electrode pads by first wirings, and first control electrodes connected to the first electrode pads by second wirings, the electrodes connected by the first wirings being superimposed over the first frame-like silicon layer, and the principal plane is joined to the second frame-like silicon layer with spacers therebetween, and the first control electrodes facing the mirror, and the lower glass substrate having a principal plane with second electrode pads connected to the external control circuits and a projection with second control electrodes connected to the second electrode pads by third wirings, the second control electrodes facing the mirror, and the principal plane is joined to the mirror substrate.

* * * * *